United States Patent
Fujikura et al.

(10) Patent No.: US 6,850,717 B2
(45) Date of Patent: Feb. 1, 2005

(54) MEDIUM THICKNESS DETECTING APPARATUS

(75) Inventors: Shuuichi Fujikura, Tokyo (JP); Masahiro Fukuda, Tokyo (JP); Toyokazu Shiraishi, Tokyo (JP); Tatsuya Murakami, Tokyo (JP); Naoki Sunaga, Tokyo (JP); Kiyoshi Matsuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 10/193,434

(22) Filed: Jul. 11, 2002

(65) Prior Publication Data

US 2003/0016959 A1 Jan. 23, 2003

(30) Foreign Application Priority Data

Jul. 17, 2001 (JP) .......................... 2001-217235

(51) Int. Cl.$^7$ .............................................. G03G 15/00
(52) U.S. Cl. .......................................... 399/45; 399/389
(58) Field of Search .......................... 399/45, 388, 389

(56) References Cited

U.S. PATENT DOCUMENTS

| | | | | |
|---|---|---|---|---|
| 4,917,512 A | * | 4/1990 | Mimura et al. ............... | 400/56 |
| 5,519,478 A | * | 5/1996 | Malachowski ............... | 399/68 |
| 5,806,992 A | * | 9/1998 | Ju ............................. | 400/56 |
| 6,256,459 B1 | * | 7/2001 | Hasegawa et al. ........... | 399/27 |

FOREIGN PATENT DOCUMENTS

| | | | |
|---|---|---|---|
| JP | 61-179774 | * | 8/1986 |
| JP | 11-139621 | * | 5/1999 |

* cited by examiner

*Primary Examiner*—Quana Grainger
(74) *Attorney, Agent, or Firm*—Akin Gump Strauss Hauer & Feld, LLC

(57) ABSTRACT

A medium thickness detecting apparatus detects the thickness of a recording medium. A displacement section is disposed in a transport path through which a recording medium passes. When the recording medium passes the displacement section, the displacement section displaces in a direction substantially normal to the surface of a recording medium. An amplifying section amplifies a displacement of the displacement section by a predetermined factor. A thickness determining section outputs a signal representative of an amplified value of the displacement. The displacement section may be one of two rollers between which the recording medium passes, and displaces upward when the recording medium passes between the two rollers. Alternatively, the displacement section my be positioned to sit on a stage provided in the transport path such that the displacement section is pushed away from the stage when the recording medium passes between the displacement section and the surface.

20 Claims, 22 Drawing Sheets

FIG.18

| RECORDING MEDIUM | FIXING TEMPERATURE [°C] | REFERENCE THICKNESS [μm] |
|---|---|---|
| 1 | 148 | 80 |
| 2 | 156 | 90 |
| 3 | 163 | 100 |
| 4 | 174 | 120 |
| 5 | 174 | 145 |

FIG.19

| DIFFERENCE IN THICKNESS [μm] | -10≤ | -5.0 ~ -9.9 | -1.1 ~ -4.9 | -1.0 ~ +1.0 | +1.1 ~ +4.9 | +5.0 ~ +9.9 | +10≤ |
|---|---|---|---|---|---|---|---|
| CORRECTION VALUE [°C] | ERROR | -4 | -2 | ±0 | +2 | +4 | ERROR |

Paper Thickness Error

MEDIUM THICKNESS DETECTING APPARATUS

BACKGROUND OF THE INVENTION

1. Field of the Invention

The present invention relates to a medium thickness detecting apparatus and an image forming apparatus.

2. Description of the Related Art

A conventional image-forming apparatus such as a printer, copying machine, and facsimile machine includes a photoconductive drum, charging roller, recording head, developing unit, transfer roller, and fixing unit, and forms an image through a predetermined image-forming processes.

The recording head is driven to form an electrostatic latent image on the surface of the photoconductive drum and the developing unit develops the electrostatic latent image into a toner image. The transfer roller transfers the toner image onto a recording medium and the fixing unit fixes the toner image into a permanent image. The fixing unit includes a heat roller and a backup roller, so that the heat roller heats the toner particles and the backup roller presses the heated toner particles against the recording medium.

However, when the toner is fused onto the recording medium, the amount of heat given to the toner varies depending on the heat capacity and temperature of the recording medium, resulting in so-called cold off-set and hot off-set that deteriorate print quality.

A tandem type image-forming apparatus includes a plurality of image-forming sections arranged along a path in which an endless transport belt runs, each image-forming section forms a toner image of a corresponding color. The recording medium passes through the respective image-forming sections in sequence so that the respective toner images are transferred one over the other in registration with one another other to form a color toner image. The color toner image has a thick layer of toner by its nature. The thicker toner layer increases the chance of offset occurring and causes poorer print quality.

One way of preventing off-set of the image is to detect the thickness of the recording medium and changes the conditions of image forming process of the respective image forming sections in accordance with the detected thickness of the recording medium. However, the accuracy of detecting the thickness cannot be improved easily.

SUMMARY OF THE INVENTION

The present invention was made to overcome the aforementioned drawbacks of the conventional art apparatus.

An object of the invention is to provide a medium thickness detecting apparatus capable of detecting the thickness of a recording medium accurately and an image-forming apparatus capable of improving print quality.

A medium thickness detecting apparatus detects the thickness of a recording medium. A displacement section is disposed in a transport path through which a recording medium passes. When the recording medium passes the displacement section, the displacement section displaces in a direction substantially normal to the surface of a recording medium. An amplifying section amplifies a displacement of the displacement section by a predetermined factor. A thickness determining section outputs a signal representative of an amplified value of the displacement.

The displacement section may be one of two rollers between which the recording medium passes and displaces upward when the recording medium passes between the two rollers.

The displacement section may be a member disposed between the two rollers and displaces upward when the recording medium passes between the two rollers.

The two rollers are in contact with each other to form a nip therebetween, and a stage is disposed near the two rollers. The stage has a surface substantially flush with a plane in which the nip formed between the two rollers extends. The displacement section is placed on the surface and is pushed away from the surface when the recording medium passes between the displacement section and the surface of the stage.

The amplifying section may be a lever supported at its fulcrum so that the lever can be rocked, and the amplifying section has a first longitudinal end portion that faces the thickness determining section and a second longitudinal end portion that abuts the displacement section.

The displacement section may be positioned to sit on a stage provided in the transport path such that the displacement section is pushed away from the stage when the recording medium passes between the displacement section and the surface of the stage.

An image forming apparatus incorporates the aforementioned medium thickness detecting apparatus. The image forming apparatus further includes a difference calculating section and a correcting section. The difference calculating section calculates a difference between a reference thickness and a thickness detected by the medium thickness detecting apparatus. The correcting section corrects conditions for image forming process based on the difference.

If the difference is equal to or larger than a predetermined value, then the recording medium may be discharged from the image forming apparatus without information printed on the recording medium. Alternatively, another recording medium may be specified. Still alternatively, a developing bias voltage may be changed so as not to form a toner image on an image bearing body. Yet alternatively, a transfer voltage may be shut off. Further alternatively, an error message may be printed on the recording medium and the recording medium is discharged from the image forming apparatus. More alternatively, the recording medium is transported back to a_duplex printing unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 18 is a table that lists fixing temperatures and reference thickness for different recording media in the sixth embodiment;

FIG. 19 is a table that lists correction values of fixing temperature for various differences in thickness between the reference thickness and detected thickness;

DETAILED DESCRIPTION OF THE INVENTION

While the present invention will be described with respect to an image-forming apparatus for forming color images, the invention is also applicable to an image-forming apparatus for forming black-and-white images.

First Embodiment

{Construction}

Figure 1:
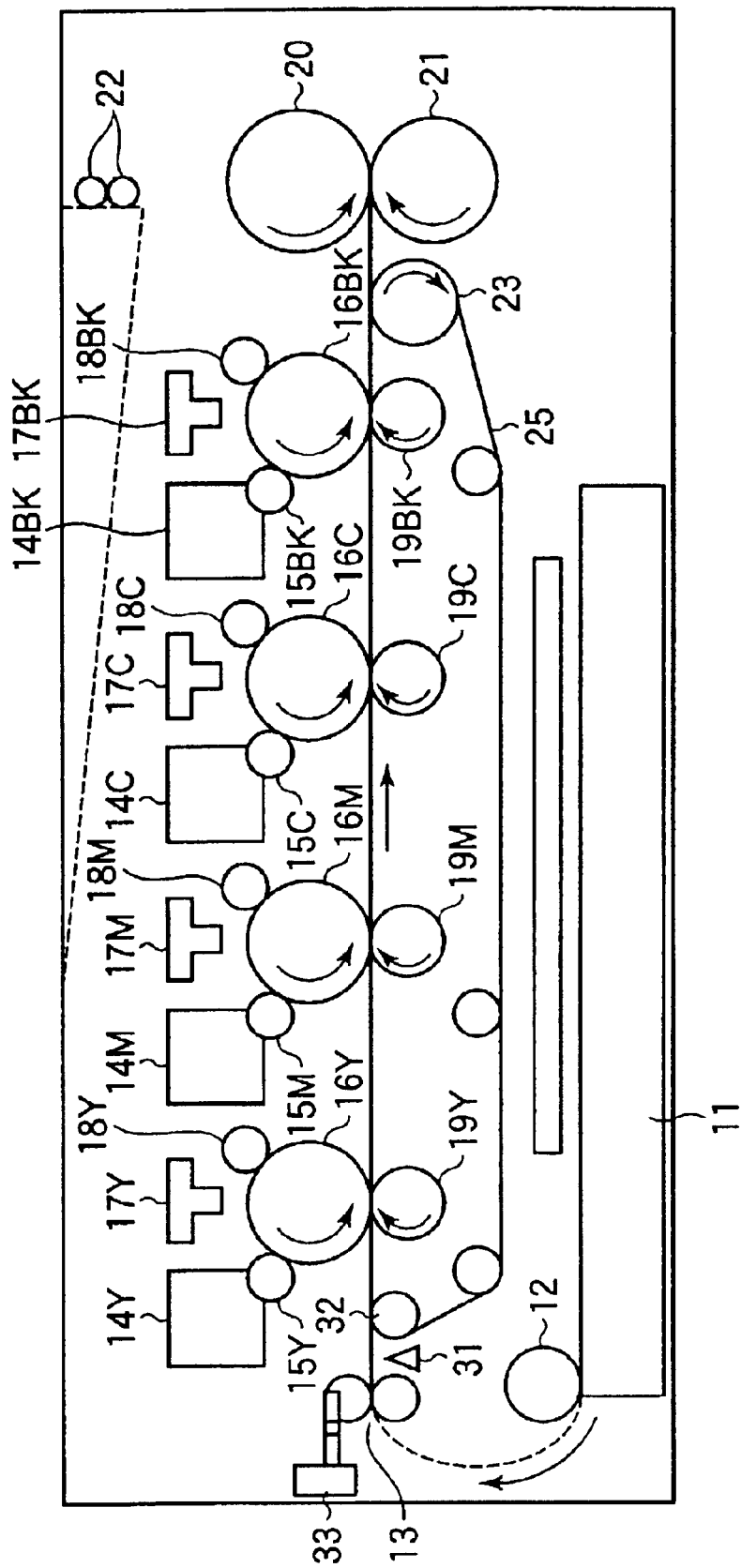
FIG. 1 illustrates a general construction of an image-forming apparatus according to a first embodiment of the present invention.

FIG. 1 illustrates a general construction of an image-forming apparatus according to a first embodiment of the present invention.

A cassette 11 holds a stack of recording media, not shown. A hopping roller 12 feeds a top page of the recording medium from the cassette 11 into a transport path. A pair of registry rollers 13 are disposed in the transport path to feed the recording medium to a transport belt 25. A paper thickness detector 33 is disposed adjacent the registry rollers 13 to detect the thickness of the recording medium. Toner bottles 14Y, 14M, 14C, and 14K hold yellow, magenta, cyan, and black toner, respectively. Photoconductive drums 16Y, 16M, 16C, and 16K are image-bearing bodies on which electrostatic latent images of corresponding colors are formed. Developing rollers 15Y, 15M, 15C, and 15K supply toner of corresponding colors to the photoconductive drums to develop the electrostatic latent images into toner images of the corresponding colors. LED heads 17Y, 17M, 17C, and 17K illuminate the surfaces of the corresponding photoconductive drums to form electrostatic latent images thereon. Charging rollers 18Y, 18M, 18C, ad 18K charge the surfaces of the corresponding photoconductive drums uniformly. Transfer rollers 19Y, 19M, 19C, and 19K transfer the tone images from the corresponding photoconductive drums onto the recording medium.

A write sensor 31 detects the timings at which the LED heads 17Y, 17M, 17C, and 17K start to emit light. A heat roller 20 includes a heater therein and heats the toner image on the recording medium, thereby fusing the toner image on the recording medium. A backup roller 21 presses the recording medium against the heat roller 20. The heat roller 20 and backup roller 21 form a fixing unit. A pair of discharging rollers 22 discharges the recording medium from the apparatus. The transport belt 25 is mounted on a drive roller 23 and a driven roller 32. A drive source, not shown, drives the drive roller 23 in rotation, thereby causing the transport belt 25 to run. A controller 24 controls the overall operation of the image-forming apparatus.

Figure 2:
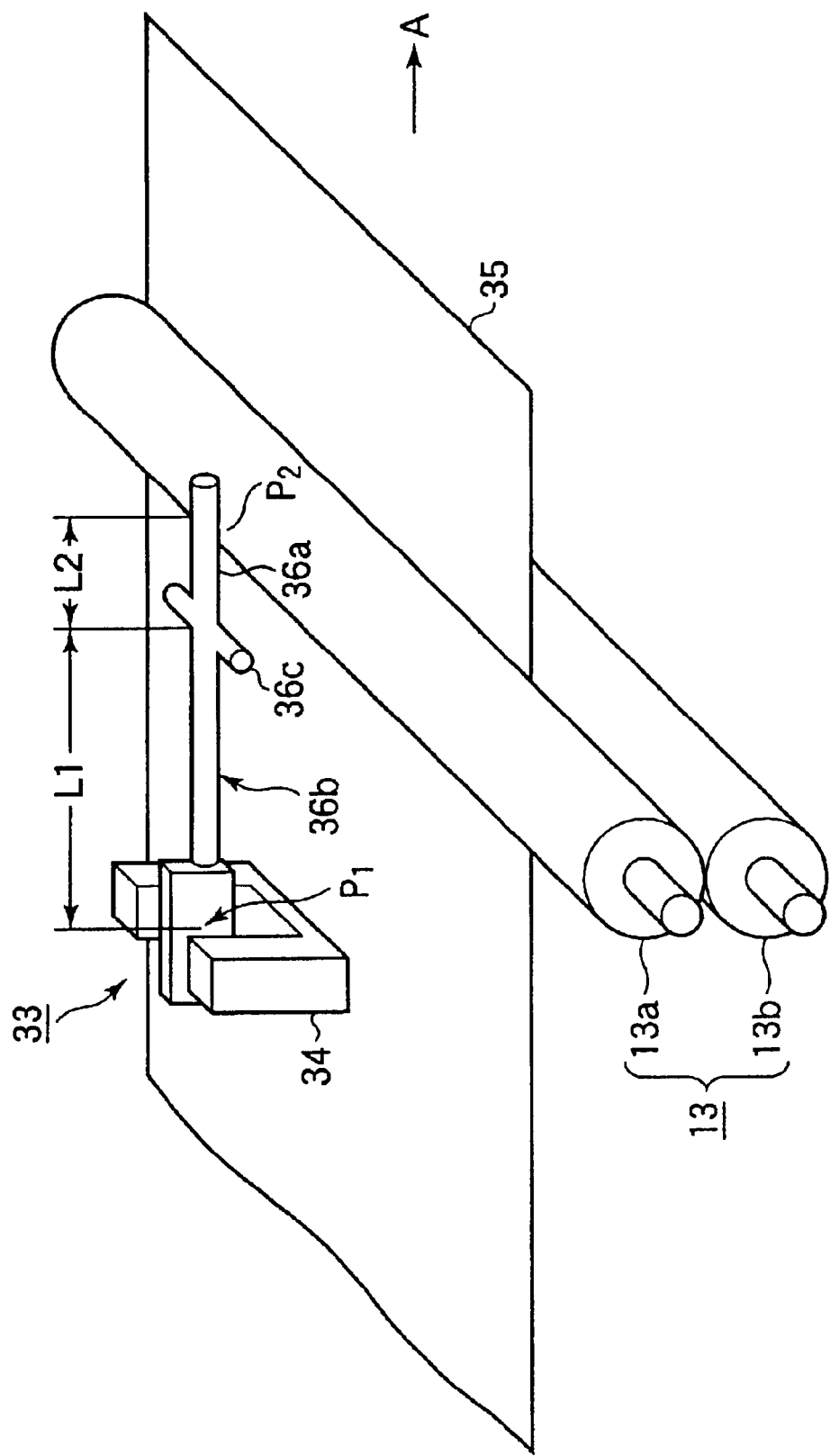
FIG. 2 is a perspective view of a paper thickness detector according to the first embodiment.

FIG. 2 is a perspective view of a paper thickness detector according to the first embodiment of the invention.

Referring to FIG. 2, the registry rollers 13 include an upper roller 13a and a lower roller 13b. The lower roller 13b is supported by means of oil-less metal support. The upper roller 13a is urged by a spring, not shown, against the lower roller 13b. Therefore, when the recording medium 35 passes between the upper and lower rollers 13a and 13b, the upper roller 13a is displaced upward substantially in a direction normal to the surface of the recording medium 35.

The paper thickness detector 33 includes a lever 36 and a photo-coupler 34. The lever 36 has a fulcrum 36c about which the lever is pivotal and the photo-coupler 34 is in the form of a micro displacement sensor. A long portion 36b extends from the fulcrum 36c to the photo-coupler 34 and has an interrupter that opposes the photo-coupler 34 at a detection point P1. A short portion 36a extends from the fulcrum 36c in a direction opposite to the long portion 36b and rests on the top surface of the upper roller 13a at a pickup point P2. The photo-coupler 34 may be replaced by a combination of a light-emitting diode and a phototransistor.

The long portion 36a has a length L1 and the short portion 36a has a length L2 and the lengths L1 and L2 are in the relation L1/L2=M/1 where M is larger than 1. Thus, the displacement of the short portion 36a at the pickup point P2 is amplified by M and appears at the detection point P1. M is selected preferably in the range of 4 to 5. In the present embodiment, M is 5. The value of M can be adjusted depending on the sensitivity of the photo-coupler 34 and the eccentricity and run out of the registry roller 13.

The lever 36 is disposed in such a way that the long portion 36b rotates downward by its own weight to interrupt the light of the photo-coupler 34. The long portion 36b is urged upward by a spring, not shown, in such a direction as to rotate upward about the fulcrum 36c. Alternatively, the short portion 36a may be urged downward by another spring, not shown.

When the recording medium 35 is pulled in between the upper roller 13a and lower roller 13b, the short portion 36a at the pickup point P2 is pushed up by a distance equal to the thickness of the recording medium 35. Thus, the detection point P1 displaces downward by a distance five (i.e., M=5) times the displacement of the pickup point P2. Thus, the photo-coupler 34 detects optically a displacement amplified by a factor of 5. The thickness of the recording medium 35 is determined from the detected displacement.

Figure 3:
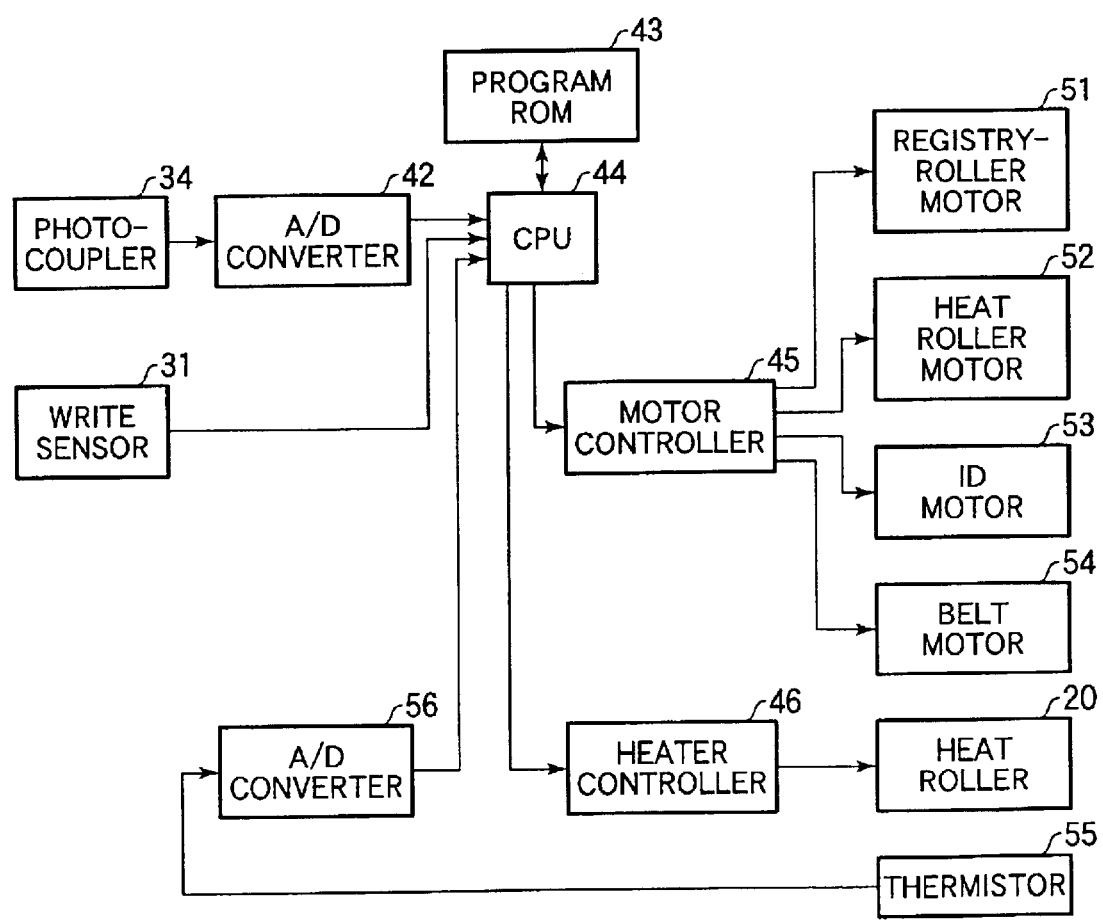
FIG. 3 is a block diagram, illustrating the controller according to the first embodiment.

FIG. 3 is a block diagram, illustrating the controller 24 (FIG.

1) According to the First Embodiment.

Referring to FIG. 3, a CPU 44 operates under the control of a program stored in a program ROM 43. An A/D converter 42 converts an analog signal received from the photo-coupler 34 into a digital signal. A motor controller 45 controls various motors and a heater controller 46 controls the heater in the heat roller 20.

A registry-roller motor 51 drives the registry rollers 13 in rotation. A heat roller motor 52 drives the heat roller 20 in rotation. An ID motor 53 drives the photoconductive drums in rotation and a belt motor 54 that drives the transport belt 25 to run. An A/D converter 56 converts an analog value of the output of the thermistor 55 into a digital value.

An interface, not shown, receives sensor outputs from sensors, not shown, and outputs signals to actuators, not shown, and connects the image-processing sections to personal computers. The CPU 44 may incorporate a functional block that performs the functions of the A/D converters 42 and 56 and program ROM 43.

{Operation}

Figure 4:
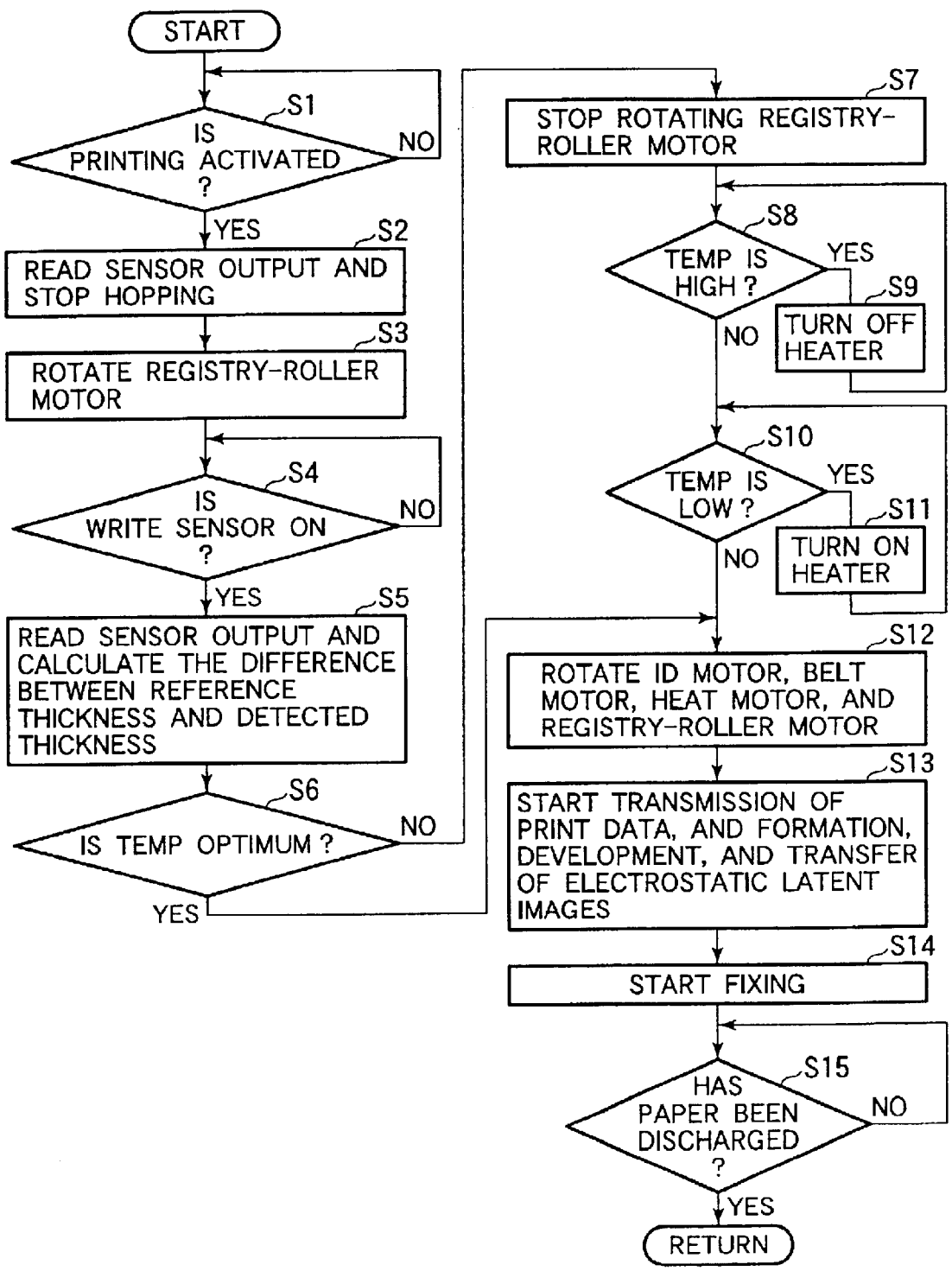
FIG. 4 is a flowchart, illustrating the operation of the image forming apparatus according to the first embodiment.

FIG. 4 is a flowchart, illustrating the operation of the image-forming apparatus according to the first embodiment.

The sensor output of the photo coupler 34 is an analog signal and varies with time and ambient temperature. Every time a print command is received from a host apparatus, the CPU 44 reads the output of the photo-coupler 34 (S2), the output indicating when the recording medium 35 is absent. The CPU 44 stores the output into a register, not shown.

The CPU 44 causes the hopping roller 12 to rotate to feed the top page of the recording medium 35 held in the cassette 11 to the registry roller 13 (S2). The position of the recording medium 35 is adjusted so that the recording medium 35 is fed to the registry rollers 13 in a laterally centered position.

When the recording medium 35 reaches the registry rollers 13, the motor controller 45 drives the registry-roller motor 51 to transport the recording medium 35 (S3). When the recording medium 35 reaches the registry rollers 13, the hopping roller 12 stops rotating.

Subsequently, when the recording medium 35 reaches the write sensor 31, the CPU 44 reads the output of the photo-coupler 34 again (S5). The CPU 44 calculates the difference between this value and the value previously stored in the register (S5). Based on the difference, the CPU 44 calculates a displacement of the detection point P1 of the lever 36 to determine the thickness of the recording medium 35.

The detection of the thickness of recording medium 35 determines a temperature required for fixing a toner image on the recording medium 35. The CPU 44 reads the temperature of the heat roller 20 detected by the thermistor 55 to determine whether the temperature of the heat roller 20 is an optimum. If the temperature is not optimum (NO at S6), the registry-roller motor 51 is stopped (S7). For example, if the temperature exceeds the optimum temperature by a certain value (S8), then the heater of the heat roller 20 is turned off (S9). If the temperature is below the optimum temperature by a certain value (S10), then the heater of the heat roller 20 is turned on (S11). When the temperature of the heat roller 20 falls in an optimum range (YES at S6), the CPU 44 again causes the registry-roller motor 51 to rotate the registry rollers 13. The CPU also causes the ID motor 53, belt motor 54, and heat roller motor 52 to rotate (S13). As long as the temperature of the heat roller 20 is within the optimum range, the registry-roller motor 51 is not stopped and therefore the registry rollers 13 will not stop.

The recording medium 35 is transported on the transport belt 25 to pass through the photoconductive drums 16Y, 16M, 16C, and 16K of yellow magenta, cyan, and black images in sequence. The CPU 44 performs the transfer of the image data, formation of electrostatic latent image, development of the electrostatic latent image, and transfer of toner images of the respective colors (S13). In this manner, the toner images of the respective colors are transferred onto the recording medium 35 in registration with one another and then transported to the fixing unit.

The toner bottle 14Y holds yellow toner therein and supplies the yellow toner little by little to the developing roller 15Y. The yellow toner is triboelectrically charged due to the friction between the developing roller 15Y and a developing blade, not shown. The charged yellow toner migrates to the photoconductive drum 16Y with the aid of the Coulomb force, thereby forming a yellow toner image on the photoconductive drum 16Y.

The transfer roller 19Y transfers the yellow toner image formed on the photoconductive drum 16Y onto the recording medium 35. For this purpose, the transfer roller 19Y receives a transfer voltage opposite in polarity to the charge of the toner.

Then, the CPU 44 begins to cause the heat roller 20 and backup roller 21 to fix the toner image on the recording medium 35 (S14). When the recording medium 35 passes between the heat roller 20 and backup roller 21, the toner is heated to fuse on the recording medium 35. Then, the discharging roller 22 discharges the recording medium 35 to the stacker (S15).

As described above, the "mechanical amplification factor M" of the lever 36 can be adjusted as required to increase the sensitivity of the photo-coupler 34. Thus, the detection accuracy of the recording medium 35 can be improved.

The fixing temperature can be set to an optimum temperature in accordance with the thickness of the recording medium 35, thereby eliminating the chance of offset occurring and improving print quality.

Changing the transfer voltage in accordance with the thickness of recording medium will not only improve transfer efficiency but also prevent the scattering of toner, thereby improving print quality.

In order to prevent the recording medium from being curled near the exit of the apparatus, the recording medium may be discharged through a corresponding exit depending on the thickness of the recording medium.

FIG. 4 is a flowchart illustrating the operation of the image forming apparatus according to the first embodiment.

The flowchart of FIG. 4 will be described.

Step 1: A check is made to determine whether printing is activated.

Step S2: The CPU 44 reads the outputs of sensors and starts feeding the recording medium 35.

Step S3: The CPU 44 causes the registry-roller motor 51 to start rotating.

Step S4: A check is made to determine whether the write sensor 31 is ON.

Step S5: The CPU 44 reads the output of the write sensor 31 and calculates, the difference between the output of the write sensor 31 and the value previously stored in the register.

Step S6: A check is made to determine whether the heat roller 20 is at the optimum temperature. If YES, the program proceeds to step S12. If NOT, then the program proceeds to step S7.

Step S7: The CPU 44 causes the registry-roller motor 51 to stop.

Step S8: A check is made to determine whether the temperature of the heat roller 20 is too high. If YES, the program proceeds to step S9. If NOT, the program proceeds to step S10.

Step S9: The CPU 44 turns off the heater of the heat roller 20.

Step S10: A check is made to determine whether the temperature of the heat roller 20 is too low. If YES, then the program proceeds to step S11. If NOT, then the program proceeds to step S12.

Step S11: The CPU 44 turns on the heater of the heat roller 20.

Step S12: The CPU 44 causes the ID motor 53, belt motor 54, heat roller motor 52, and registry roller motor 51 to rotate.

Step S13: The CPU 44 starts transmitting the image data, forming an electrostatic latent image, developing the electrostatic latent image into a toner image, and transferring the toner image.

Step S14: The CPU 44 starts fixing the toner image on the recording medium 35.

Step S15: A check is made to determine whether the recording medium 35 has been discharged from the apparatus.

Second Embodiment

{Construction}

Figure 5:
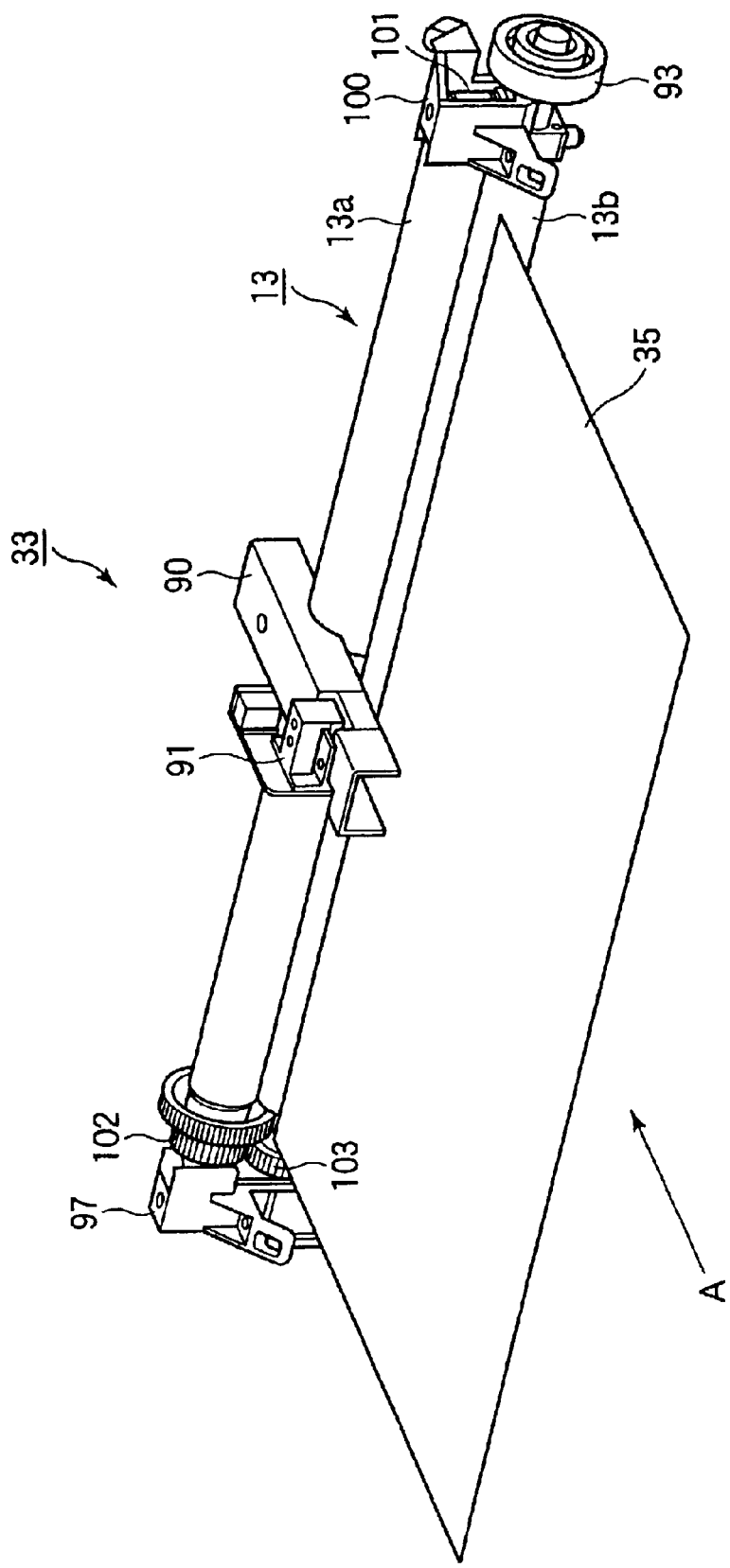
FIG. 5 illustrates an outline of the operation of a paper thickness detecting section according to a second embodiment.

FIG. 5 illustrates the general construction and principle of operation of a paper thickness detecting section 33 according to a second embodiment.

Figure 6:
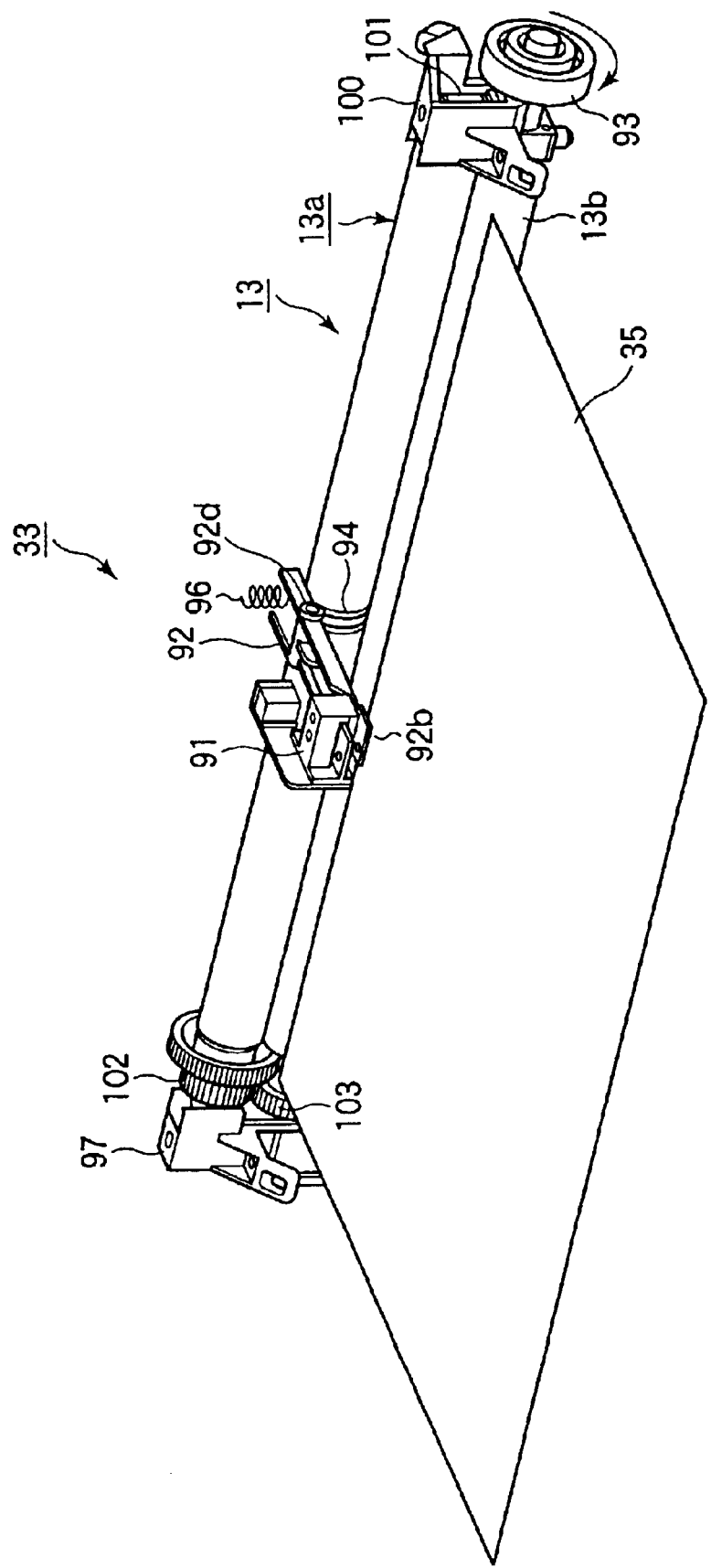
FIG. 6 is a perspective view, illustrating the operation of the paper thickness detecting section in FIG. 5.

FIG. 6 is a perspective view, illustrating the operation of the paper thickness detecting section 33 of FIG. 5 when a holder is removed.

Referring to FIGS. 5 and 6, the registry rollers 13 are disposed to extend across the transport path. Left guide 97 and right guide 100 support the longitudinal ends of the upper roller 13a and lower roller 13b in such a way that the rollers 13a and 13b are rotatable. A spring 101 urges the upper and lower rollers 13a and 13b against each other. A gear 102 is fixed to one end of the upper roller 13a and another gear 103 is fixed to one end of the lower roller 13b. The gears 102 and 103 are in mesh with each other. A drive gear 93 is fixed to the other end of the lower roller 13b. The upper roller 13a has an annular groove 94 formed therein, the groove 94 being located in a longitudinal direction at a center of the upper roller 13a and having a predetermined depth.

A holder 90 is fixedly mounted to a predetermined part of the image-forming apparatus and holds the lever 92 in such a way that the lever 92 is supported inside of the holder 90 and pivotal about the bearing portion 92d. The holder 90 also holds a photo sensor 91 mounted to an inner wall of the holder 90. The lever 92 extends in a direction substantially parallel to a direction shown by arrow A (FIG. 5) in which the recording medium 35 is transported.

Figure 7:
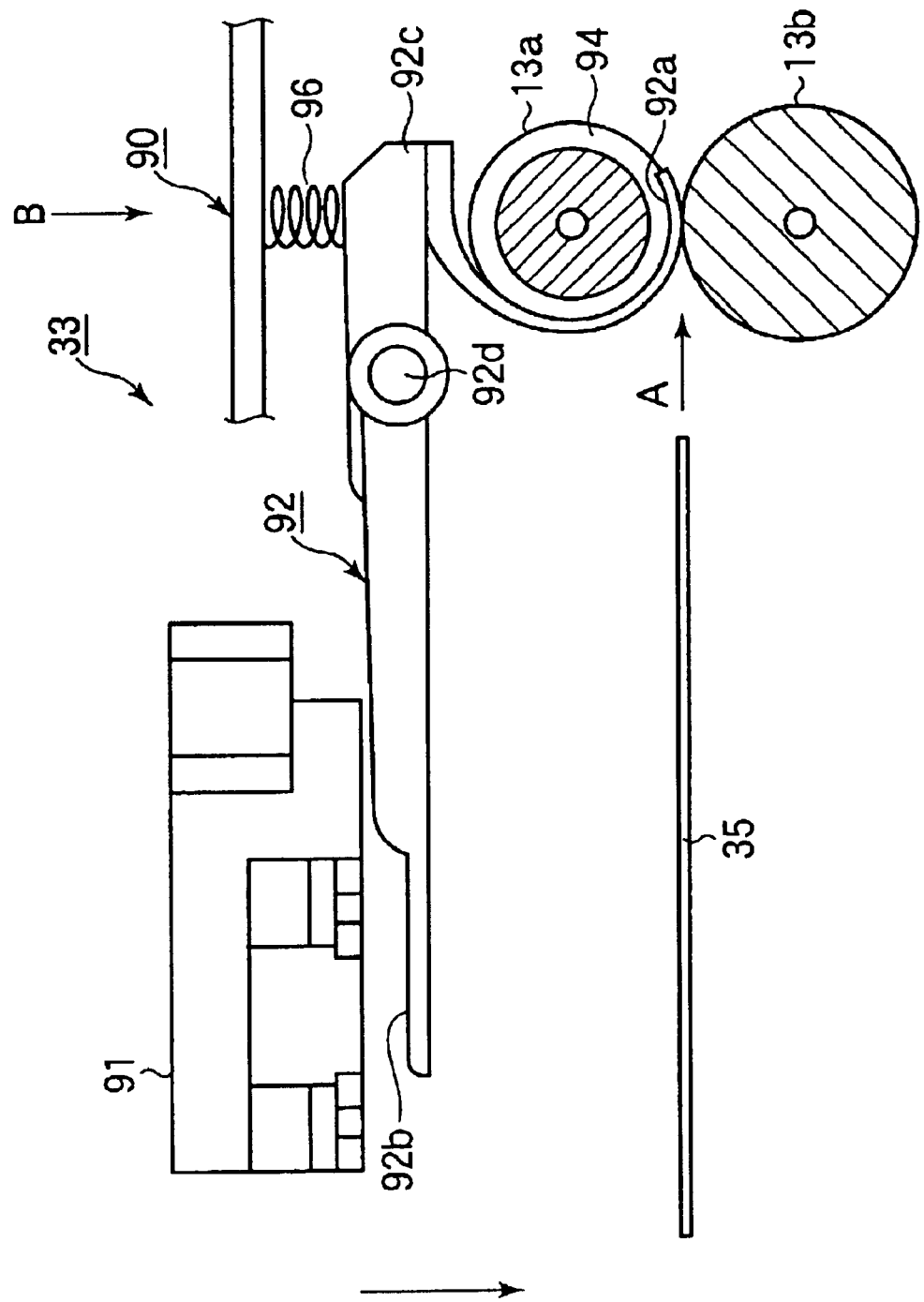
FIG. 7 is a cross-sectional view, illustrating the operation of the paper thickness detecting section.

FIG. 7 is a partially cross-sectional view, illustrating the operation of the paper thickness detecting section 33.

The lever 92 has one longitudinal end portion 92c to which a detection element 92a is formed and the other longitudinal end portion on which a reflecting surface 92b is provided. The lever 92 is made of a synthetic resin (plastics) with a certain amount of glass fiber contained therein so that the reflecting surface 92b is sufficiently reflective. The end portion 92c is between the inner upper wall of the holder 90 and the upper roller 13a. The reflecting surface 92b is immediately below the photo sensor 91. The photo sensor 91 has a light emitting section and a light receiving section. The light emitting section emits light and the reflecting surface 92b reflects the light back to the light receiving section. The light reflected back by the reflecting surface is due to diffusion reflection. The use of diffusion reflection is advantageous in that the sensor output increases and therefore indicates the displacement of the reflecting surface 92b precisely. The detection element 92a is substantially C-shaped and extends downwardly from the end portion 92c of the lever 92 in the annular groove 94, describing an arc. The detection element 92a has a free end portion that is between the upper roller 13a and the lower roller 13b and abuts the circumferential surface of the lower roller 13b. The surface of the detecting element 92a in contact with the circumferential surface of the lower roller 13b is coated with a wear-resistant, low-fiction material. A compression spring 96 is mounted between the inner wall of the holder 90 and the end portion 92c. The spring 96 urges the end portion 92c in a direction shown by arrow B so that the detecting element 92a abuts the roller surface of the lower roller 13b.

The paper thickness detecting section 33 detects the thickness of the recording medium 35. The paper thickness detecting section 33 includes the reflection type photo-sensor 91, lever 92, detection element 92a, and spring 96. When the recording medium 35 passes between the upper roller 13a and lower roller 13b, the detection element 92a is pushed by the recording medium 35 and is displaced in the direction normal to the surface of the recording medium 35. The lever 92 amplifies the displacement of the detection element 92a by a predetermined amplification factor, determined by the ratio of the distance between the end potion 92c and the bearing portion 92d to the distance between the reflecting surface 92b and the bearing portion 92d. The thickness of the recording medium 35 can be determined accurately from the amplified displacement of the detection element 92a.

{Operation of Paper Thickness Detecting Section}

The operation of the paper thickness detecting section 33 of the aforementioned construction will be described with reference to FIG. 7.

Upon power up, the drive gear 93 (FIG. 6) is driven into rotation, so that the upper roller 13a rotates to advance the recording medium 35 in a direction shown by arrow A as shown in FIG. 7. When the recording medium 35 passes between the upper roller 13a and lower roller 13b, the recording medium 35 pushes up the detection element 92a, so that the lever 92 pivots counterclockwise about the bearing portion 92d to cause the reflecting surface 92b to displace downward. The photo sensor 91 detects the amount of displacement of the reflecting surface 92b and provides an output to the CPU 44. The CPU 44 determines the thickness of the recording medium 35 on the basis of the output.

As described above, the recording medium 35 pushes up the detection element 92a and the displacement of the reflecting surface 92b is detected. This method of detecting the thickness of recording medium is advantageous in that the detection result is free from the deflection of the roller 13a and is therefore accurate. The lengths L21 and L22 are in the relation L21/L22=M/1 where M is larger than 1 and L21 is a distance between the fulcrum 90a and one end of the lever 92 and L22 is a distance between the fulcrum 90a and the reflecting surface 92b. Selecting an appropriate value of M increases the sensitivity of the photo sensor 91, improving detection accuracy of the thickness of recording medium.

Third Embodiment

Figure 8:
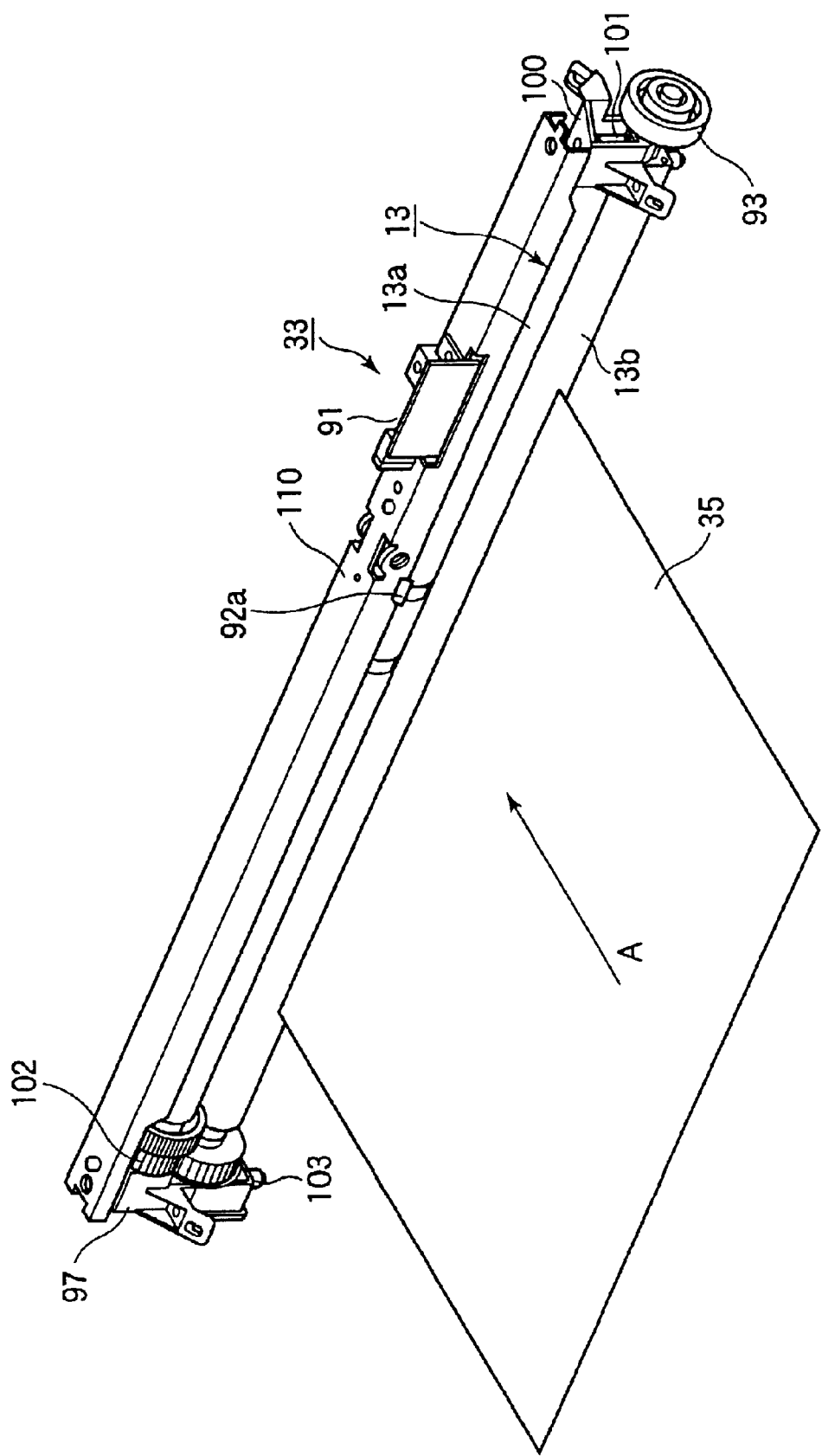
FIG. 8 is a perspective view, illustrating the operation of a paper-thickness detecting section according to a third embodiment.

FIG. 8 is a perspective view, illustrating the operation of a paper-thickness detecting section according to a third embodiment.

Figure 9:
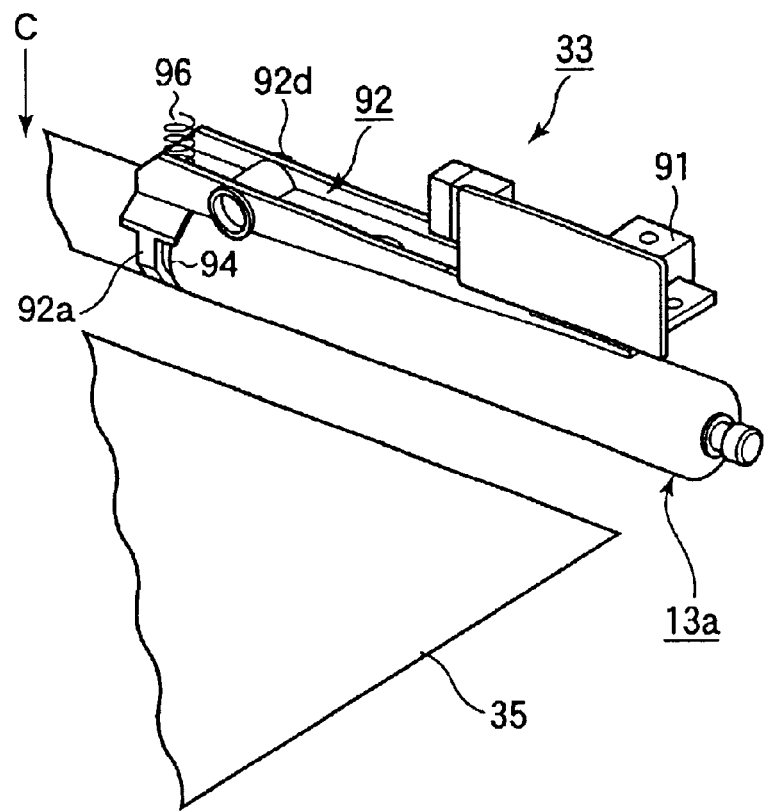
FIG. 9 is a fragmentary perspective view of the paper-thickness detecting section in FIG. 8.

FIG. 9 is a fragmentary perspective view of the paper-thickness detecting section of FIG. 8.

Figure 10:
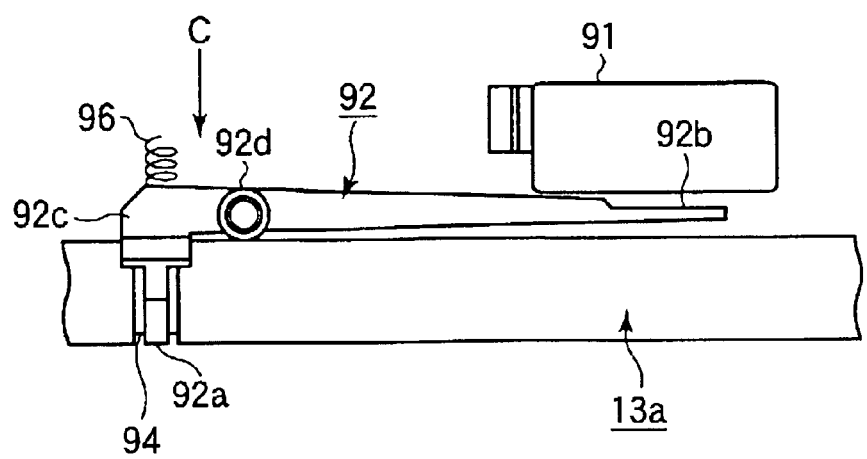
FIG. 10 is a fragmentary side view of the paper-thickness detecting section of FIG. 8.

FIG. 10 is a fragmentary side view of the paper-thickness detecting section of FIG. 8.

Referring to FIGS. 8 and 9, a paper-thickness detecting section 33 includes a reflection type photo sensor 91, a lever 92, a detecting element 92a, and a spring 96.

A holder 110 is supported at both ends thereof on a left guide 97 and a right guide 100, and extends along the shaft of the upper roller 13a. The holder 110 has a photo sensor 91 mounted thereon. The lever 92 extends under the holder 110 along the upper roller 13a and is supported in such a way that the lever 92 is pivotal about a bearing portion 92d. The spring 96 is mounted between one end of the lever 92 and the holder 110, and urges the lever 92 in a direction shown by arrow C. The lever 92 has one end portion 92c to which the detecting element 92a is fixed and another end portion at which a reflecting surface 92b is provided. The detecting element 92a extends in a circumferential groove 94 formed in the upper roller 13a, so that a free end portion of the detecting element 92a is between the rollers 13a and 13b and abuts the roller 13b.

As described above, the lever 92 extends along the upper roller 13a but does not project upstream or downstream of the upper roller 13a with respect to the transport path of the recording medium 35. Thus, the paper thickness detecting section 33 can be miniaturized.

Further, supporting the holder 110 by means of the left and right guides 97 and 100 allows accurate positioning of the lever 92 relative to the recording medium 35, so that the paper-thickness can be detected accurately.

Fourth Embodiment

Figure 11:
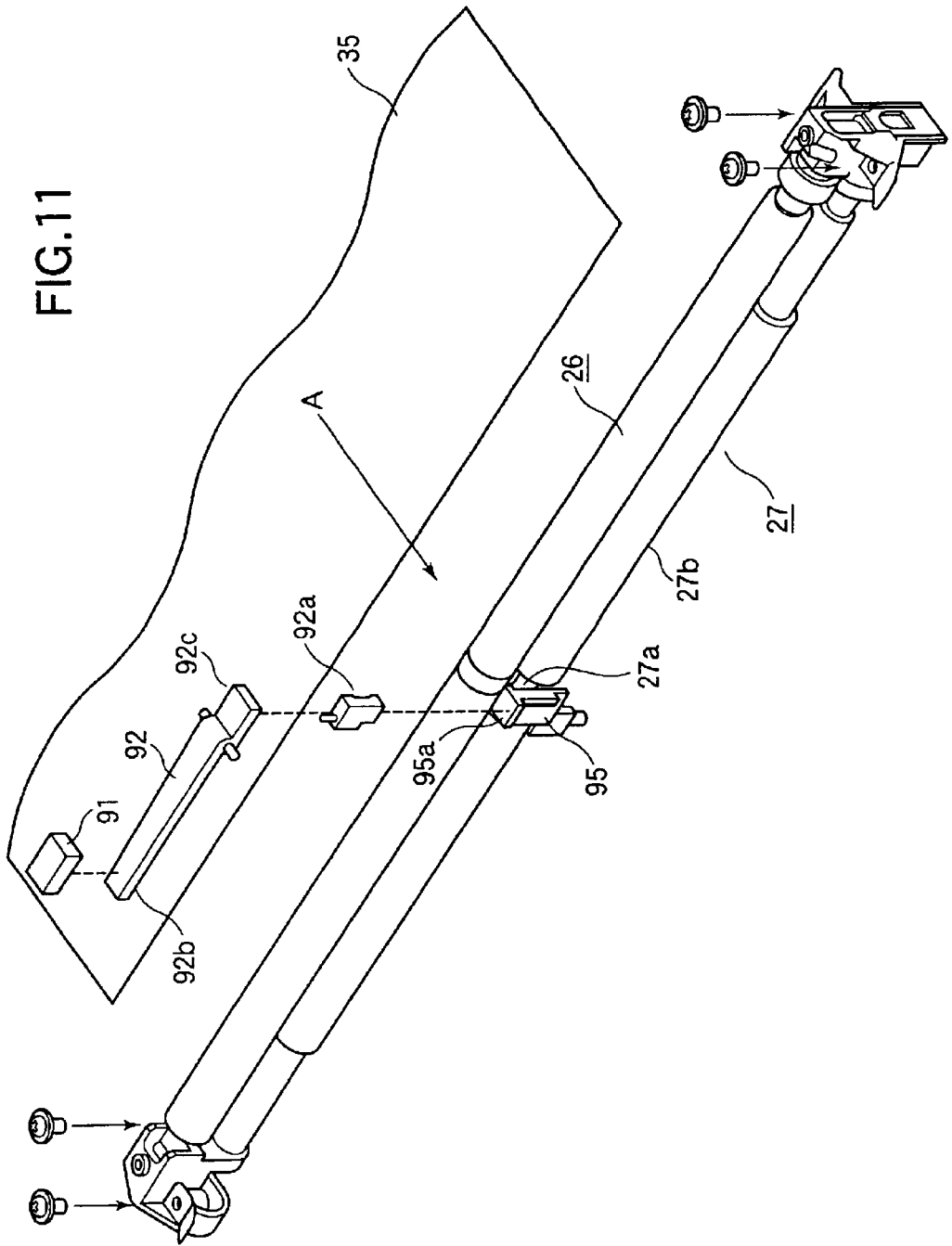
FIG. 11 is a perspective view, illustrating the general construction and principle of operation of a paper thickness detecting section according to a fourth embodiment.

FIG. 11 is a perspective view, illustrating the general construction and principle of operation of a paper thickness detecting section according to a fourth embodiment.

Figure 12:
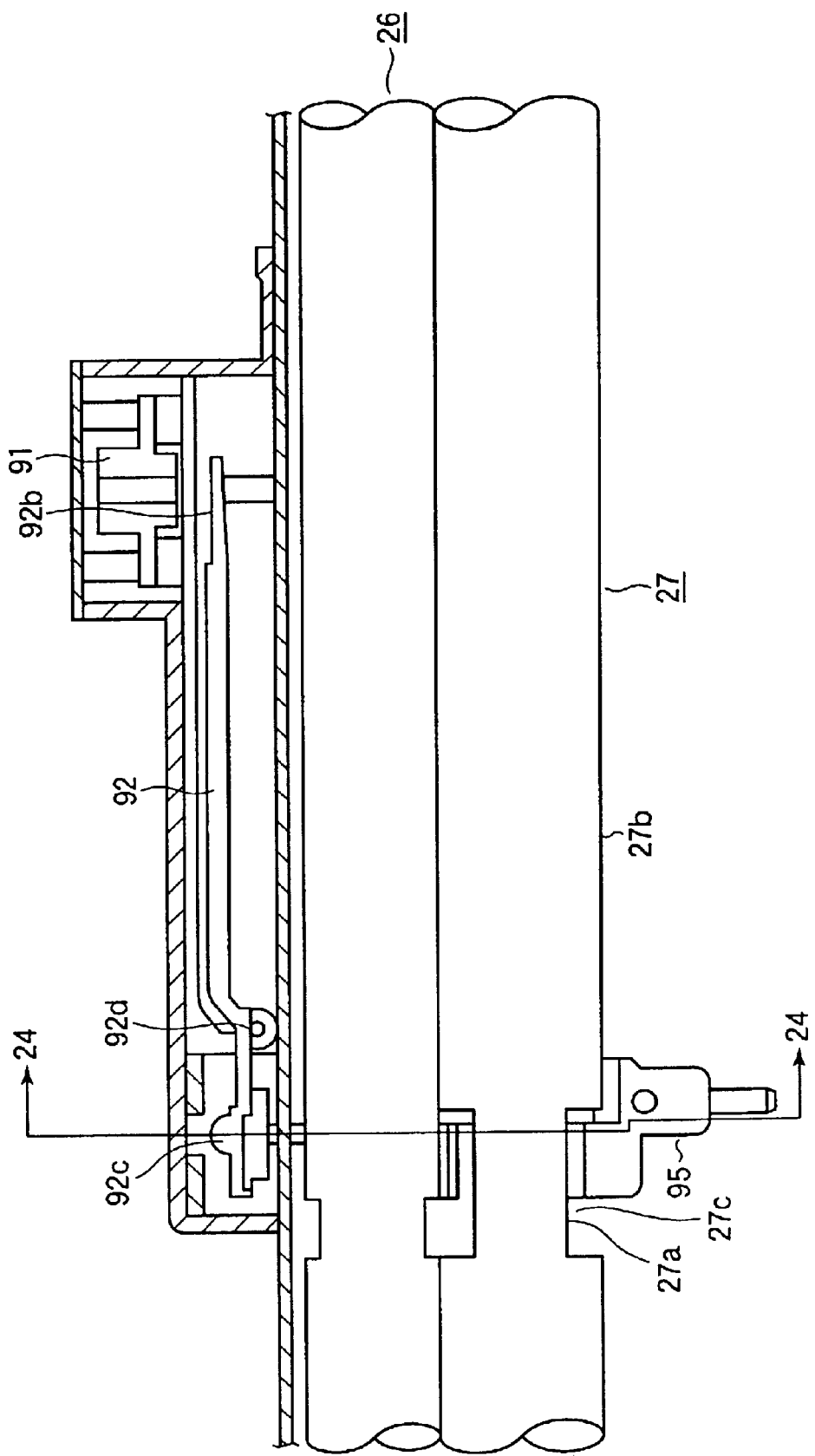
FIG. 12 is a fragmentary partially cross-sectional side view, illustrating the paper thickness detecting section of FIG. 11.

FIG. 12 is a fragmentary partially cross-sectional side view, illustrating the paper thickness detecting section of FIG. 11.

Figure 13:
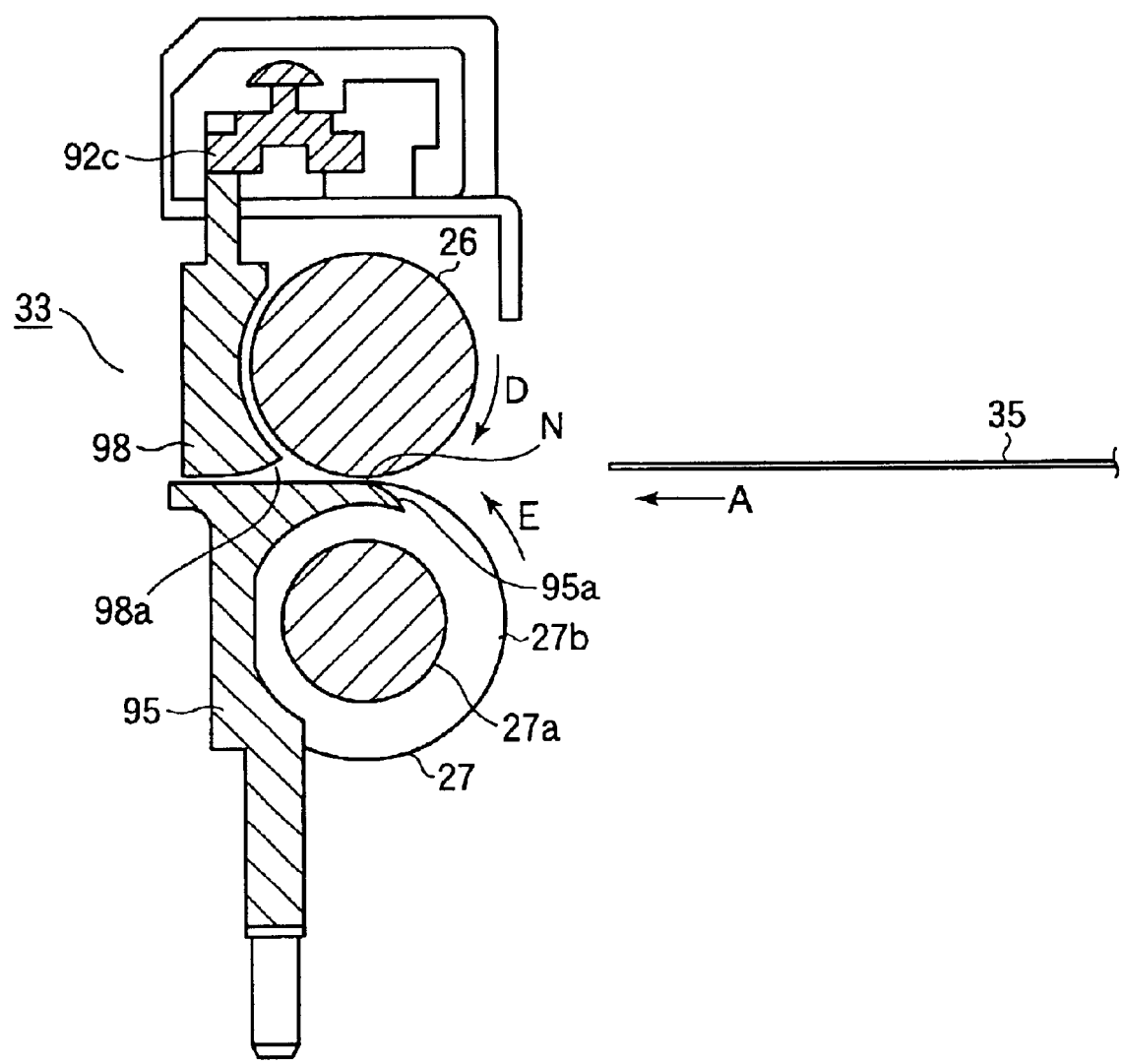
FIG. 13 is a partially cross-sectional view taken along the line 24—24 in FIG. 12, illustrating the operation of the paper thickness detecting section.

FIG. 13 is a partially cross-sectional view taken along the line 24—24 in FIG. 12, illustrating the operation of the paper thickness detecting section.

Referring to FIGS. 11 and 12, a paper-thickness detecting section 33 includes a reflection type photo sensor 91, a lever 92, a detecting element 98, and a stage 95. Registry rollers include an upper roller 26 and a lower roller 27. The lower roller 27 and upper roller 26 extend parallel to each other and are in pressure contact with each other to form a nip therebetween through which the recording medium 35 passes when the lower roller 27 and upper roller 26 rotate. The recording medium 35 advances in a direction shown by arrow A (FIG. 11). The lower roller 27 has a small-diameter portion 27a formed in its longitudinally middle portion and a large-diameter portions 27b on both sides of the small-diameter portion 27a, the large-diameter portions and the small-diameter portion defining an annular groove 27c. The lever 92 is pivotal about the bearing portion 92d so that a small vertical displacement of an end portion 92c appears on the reflecting surface 92b provided on another portion of the lever 92. The reflection type photo sensor 91 detects a vertical displacement of the reflecting surface 92b.

Referring to FIG. 13, the upper roller 26 and lower roller 27 rotate in directions shown by arrows D and E. A detection element 98 and a stage 95 are disposed downstream of the upper roller 26 and lower roller 27 with respect to the transport path of the recording medium 35. The stage 95 is stationary and the detection element 98 is supported by the surrounding structure and is movable vertically. The detection element 98 has a bottom surface that on the stage 95. The bottom surface curves slightly upward and is in contact with a top surface of the stage 95. The detecting element 98 and the stage 95 are positioned very close to the upper and lower rollers 26 and 27 so that the top surface of the stage 95 extends into the annular groove 27b in the lower roller 27 and curves slightly downward. Positioning the detecting element 98 and the stage 95 very close to the upper and lower rollers 26 and 27 allows the thickness of the recording medium 35 to be detected at a location close to the nip where the recording medium does not wave significantly. This is advantageous both in miniaturizing the apparatus and in detecting the thickness of the recording medium accurately. The stage 95 is positioned so that the top surface of the stage 95 is substantially in the same plane as the lowest portion of the circumferential surface of the upper roller 26. In other words, the top surface is substantially flush with a plane in which the nip N lies. When the recording medium 35 is transported, the recording medium 35 is pulled in between the upper roller 26 and lower roller 27 to advance further. It is to be noted that the top surface of the stage 95 extends in the direction of the transport path across the nip N. The upwardly curved bottom surface of the detection element 98 and the downwardly curved top surface of the stage 95 facilitate smooth entrance of the recording medium 35 between the stage 95 and detection element 98.

When the recording medium 35 enters between the detection element 98 and the stage 95, the recording medium 35 pushes up the detection element 98, which in turn pushes up the end portion 92c (FIG. 12). The upward displacement of the end portion 92c is amplified and the amplified displacement appears on the reflecting surface 92b provided on another end portion of the lever 92. The reflection type photo sensor 91 detects the vertical displacement of the reflecting surface 92b, thereby detecting the thickness of the recording medium 35.

Fifth Embodiment

Figure 14:
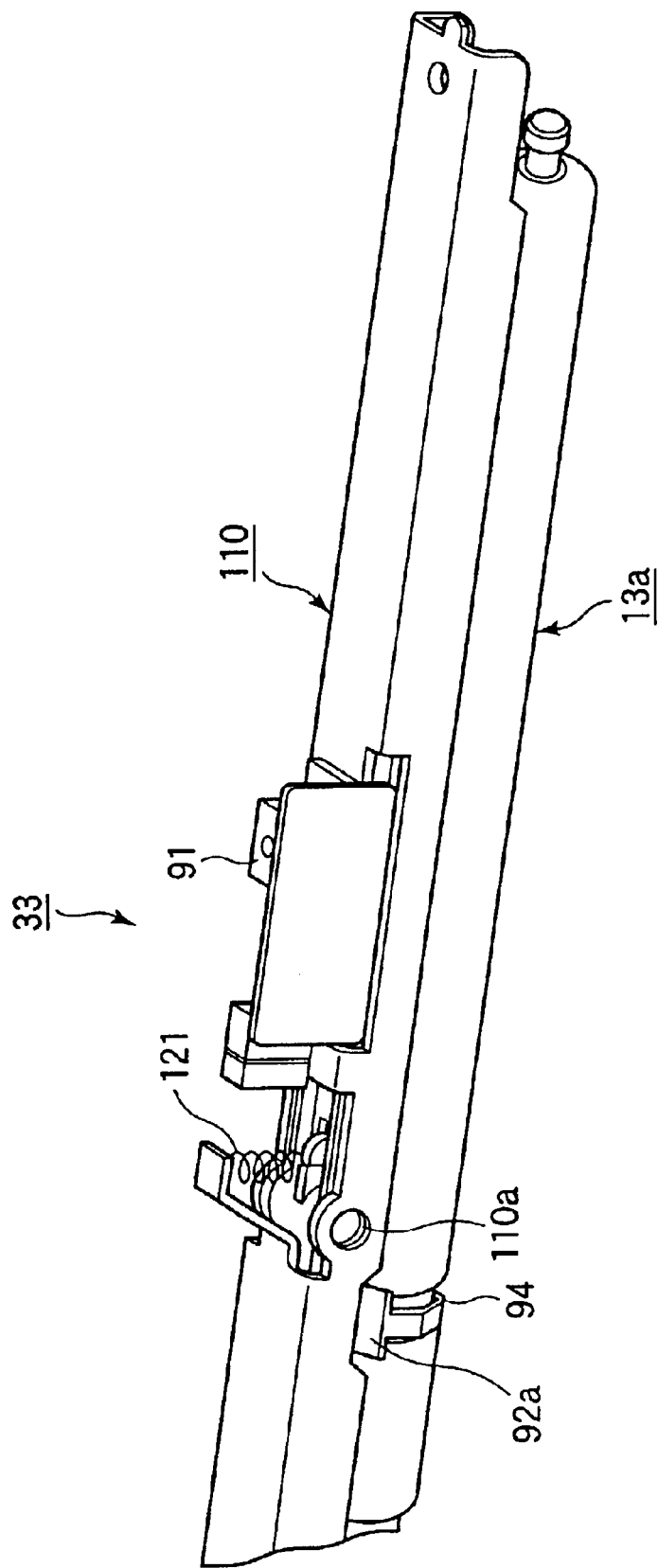
FIG. 14 is a perspective view of a paper-thickness detecting section according to a fifth embodiment.

FIG. 14 is a perspective view, illustrating the operation of a paper-detecting section according to a fifth embodiment.

Figure 15:
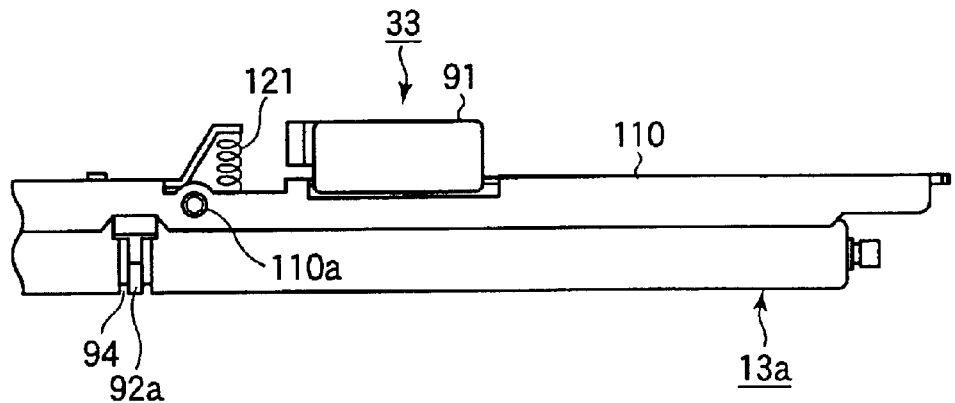
FIG. 15 is a front view of the paper-thickness detecting section of FIG. 14.

FIG. 15 is a fragmentary front view of the paper-detecting section of FIG. 14.

Figure 16:
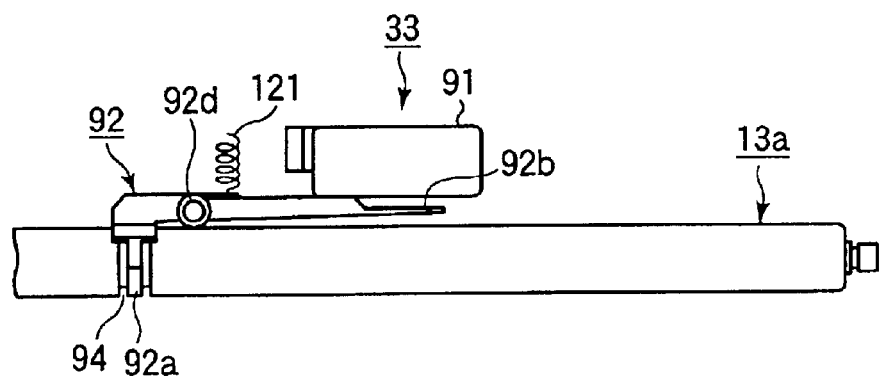
FIG. 16 is another fragmentary front view of the paper-detecting section of FIG. 14 when a holder is removed.

FIG. 16 is another fragmentary front view of the paper-detecting section of FIG. 14, when the holder is removed.

Referring to FIGS. 14 and 15, the paper-thickness detecting section 33 includes the reflection type photo sensor 91, the lever 92, the detecting element 92a, and a tension spring 121. The tension spring 121 urges the lever 92 in such a direction as to pull the lever 92 toward the reflection type photo sensor 91.

The holder 110 is supported just as the holder 110 in the third embodiment shown in FIG. 8. That is, the holder 110 has one end supported by the left guide 97 and the other end supported by the right guide 100, so that the holder 110 extends along the shaft of the upper roller 13a. The holder 110 has a photo sensor 91 mounted thereon. The lever 92 extends below the holder 110 along the upper roller 13a and is supported in such a way that the lever 92 is pivotal about a bearing hole 110a. The tension spring 121 is mounted between the lever 92 and the holder 110 and urges the lever 92 toward the photo sensor 91. The lever 92 has one end to which the detecting element 92a is fixed and another end to which a reflecting surface 92b is fixed. The detecting element 93a extends in the annular groove 94 formed in the upper roller 13a, so that a free end of the detecting element 92a between the rollers 13a and 13b and abuts the lower roller 13b.

As described above, the pivotally supported lever 92 is urged so that the lever 92 is placed in position when it is at rest. Therefore, even when the lever 92 has some play between the bearing hole 110a and a supporting shaft, not shown, that extends through the bearing hole 110a, the lever 92 is urged upward by the spring 121 toward a limiter, not shown. Thus, the detecting element 92a is pushed by the recording medium 35 in the same upward direction that the spring urges the lever 92, so that the positional error and rattling of the lever 92 are absorbed and the paper-thickness is more accurately detected accordingly.

Sixth Embodiment

{Construction}

The paper-thickness detecting sections according to the first and fifth embodiments can be applied to image forming apparatus according to sixth to ninth embodiments.

Figure 17:
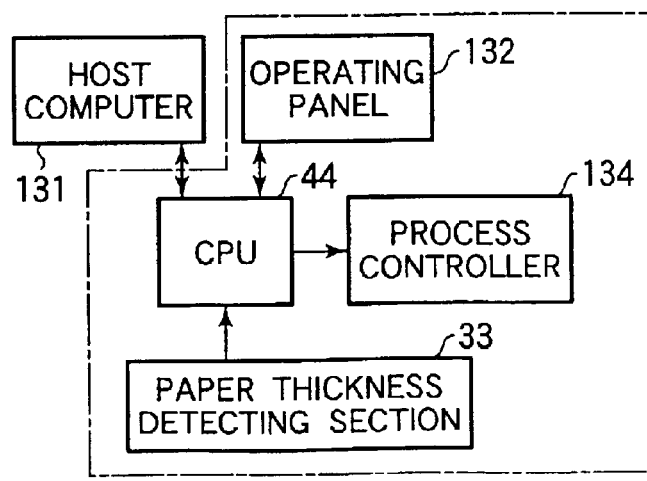
FIG. 17 is a block diagram, illustrating a control system for an image forming apparatus according to a sixth embodiment.

FIG. 17 is a block diagram, illustrating a control system of an image forming apparatus according to a sixth embodiment.

Referring to FIG. 17, an image forming apparatus receives information over a cable or a network from a host computer 131 through which a user sets a desired recording medium. The paper-thickness detecting section 33 of FIG. 2, for example, is disposed near the upper roller 13a and detects the thickness of the recording medium 35. A CPU 44 receives the media information, i.e., information on medium received from the host computer 131 or through an operating panel 132 of the apparatus, and compares the media information with paper-thickness information detected by the paper-thickness detecting section 33.

FIG. 18 is a table that lists a variety of recording media and corresponding fixing temperatures and reference thickness of recording medium.

FIG. 19 is a table that lists correction values of fixing temperature for various differences in thickness between the reference thickness and detected thickness.

Recording medium 1 to recording medium 5 have specific temperatures and reference thickness of recording medium, respectively, as shown in FIG. 18. The CPU 44 (FIG. 17) reads the sensor output from the paper-thickness detecting section 33. On the basis of the sensor output, the CPU 44 corrects the fixing temperature or informs the user of an error in specifying the medium thickness if the difference in thickness between the reference thickness and detected thickness exceeds a certain threshold value.

{Operation}

Figure 20:
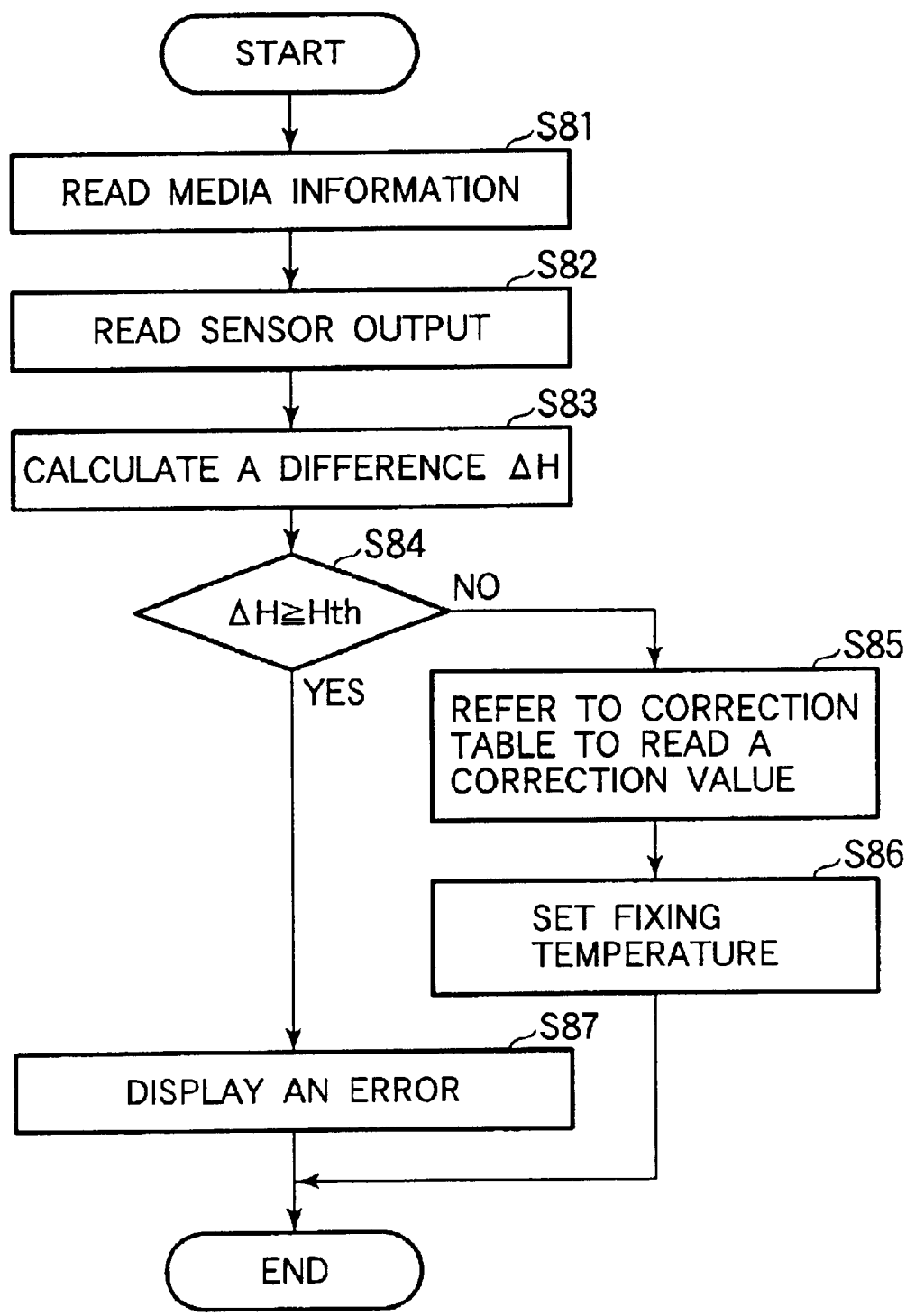
FIG. 20 is a flowchart, illustrating the operation of the sixth embodiment.

FIG. 20 is a flowchart, illustrating the operation of the sixth embodiment.

For this purpose, upon activation of printing, the CPU 44 reads the media information from the host computer 131 or the operating panel 132 (S81), and then sets a specific recording medium. Then, the CPU 44 refers the image process table stored in a memory, not shown, for a specified one of the recording medium 1 to recording medium 5, thereby setting conditions of image forming process for the specified recording medium.

The recording medium 35 (FIG. 2) is fed from the tray 11 (FIG. 1) into the transport path of the recording medium and the recording medium 35 is advanced toward the paper-thickness detecting section 33.

The CPU 44 reads the sensor output when the recording medium 35 has not arrived at the paper-thickness detecting section 33 yet, and then reads the sensor output again when the recording medium 35 has arrived (S82), thereby determining the paper-thickness based on the difference in sensor outputs. The paper thickness is determined only for the first page of the recording medium for one printing job.

Subsequently, the CPU 44 determines a difference ΔH between a thickness Hd detected by the paper-thickness detecting section 33 and the values of reference thickness Hr for recording medium 1 to 5 (S83). The CPU 44 compares the difference ΔH with a predetermined threshold value Hth. If ΔH<Hth and the paper thickness is slightly different from the reference thickness Hr, the CPU 44 performs the correction of fixing temperature. That is, the CPU 44 refers a correction table shown in FIG. 19 to read a correction value (S85), thereby correcting the fixing temperature with the correction value to set an appropriate fixing temperature (S86). If ΔH≧Hth and the paper thickness deviates from the reference thickness Hr by a large amount, the CPU 44 determines that an error has occurred. Then, the CPU 44 stops transferring the recording medium 35 while also displaying an error message on the host computer 131 or the operating panel 132 (S87).

For example, if the recording medium 2 is specified, the reference value of fixing temperature for the recording medium 2 is 156° C. and the reference thickness Hr is 90 μm. If the thickness Hd of a recording medium detected by the paper-thickness detecting section 33 is 87 μm, the difference ΔH between the detected thickness Hd and the reference thickness Hr is −3 μm. Therefore, the correction value is −2° C., i.e., the fixing temperature is 154° C.

When ΔH>Hth (e.g., ΔH=±10 μm), the CPU 44 indicates to the user that an error has occurred, and stops transporting the recording medium 35.

As mentioned above, the paper thickness is detected for recording medium 1 to recording medium 5 and the fixing temperature is set on the basis of the difference ΔH, preventing poor printing quality, poor fixing, the tacking of the recording medium to the fixing unit.

In the present embodiment, the correction table is referred to read a correction value from the correction table. Instead, the correction value may be calculated by using a predetermined formula. Such a calculation can be performed in software or hardware.

If the paper thickness deviates from the reference thickness Hr by a large amount, not shown, of the CPU 44 may change the setting of recording medium, allowing the user to use a recording medium other than that currently specified. Various modes can be selected and registered before printing, including a mode where an error is displayed and the transportation of the recording medium 35 is stopped and a mode where the setting of recording medium can be changed.

In addition to the fixing temperatures, the CPU 44 can determine values that represent the conditions of image forming process. Once the values representative of the conditions of image forming process are determined, the CPU 44 provides the values to the process controller 134, which in turn performs printing in accordance with the values.

The sixth embodiment detects paper thickness while the recording medium is being transported. For reliable detection of paper thickness, detection is preferably effected when the recording medium 35 is at rest.

The flowchart will be described.

Step S81: Information on the recording medium is read.
Step S82: The sensor output is read.
Step S83: The difference ΔH is calculated.
Step S84: A check is made to determine whether ΔH≧Hth where Hth is a predetermined threshold value. If ΔH>Hth, then the program proceeds to S85.
Step S85: A correction table is referred.
Step S86: A fixing temperature is set.
Step S87: An error is displayed and the error handling operation is completed.

Seventh Embodiment

{Construction}

In the sixth embodiment, when an error occurs, the occurrence of error is indicated to the user and the transport of the recording medium 35 is stopped. Then, the user opens the cover of the image forming apparatus to take out the recording medium from the apparatus. The operation of taking out the recording medium 35 is rather burdensome. When the image forming apparatus is used on a network, many users access the image forming apparatus. Once an error occurs, print data will pile up in the image forming apparatus before the recording medium 35 has been taken out of the apparatus.

A seventh embodiment is directed to an apparatus in which the recording medium 35 is discharged without stopping. A control system of an image forming apparatus according to the seventh embodiment is the same as that of the sixth embodiment and therefore a description will be given with reference to FIG. 17.

Figure 21:
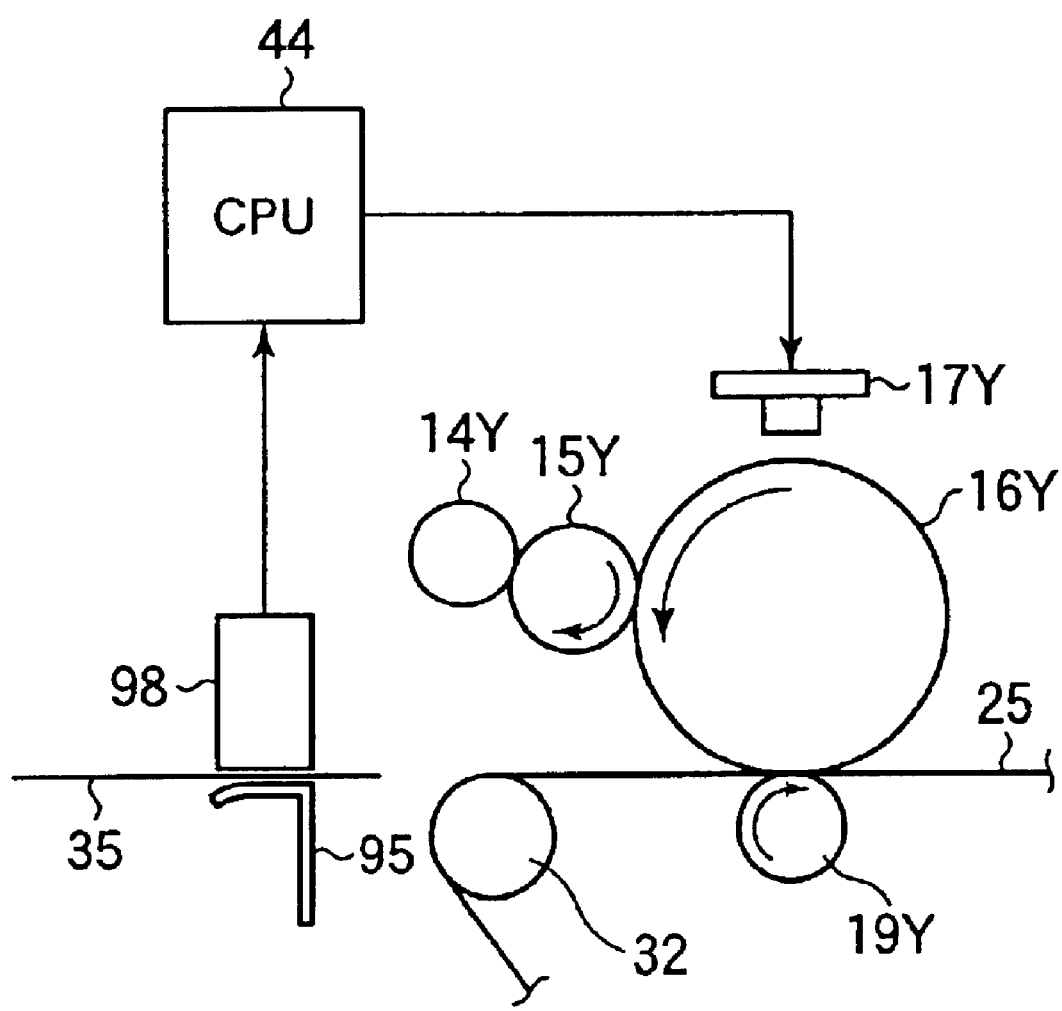
FIG. 21 illustrates, by way of example, a general construction of a pertinent portion of a yellow image forming section according to a seventh embodiment.

FIG. 21 illustrates, by way of example, a general construction of a pertinent portion of a yellow image forming section according to the seventh embodiment.

{Operation}

Figure 22:
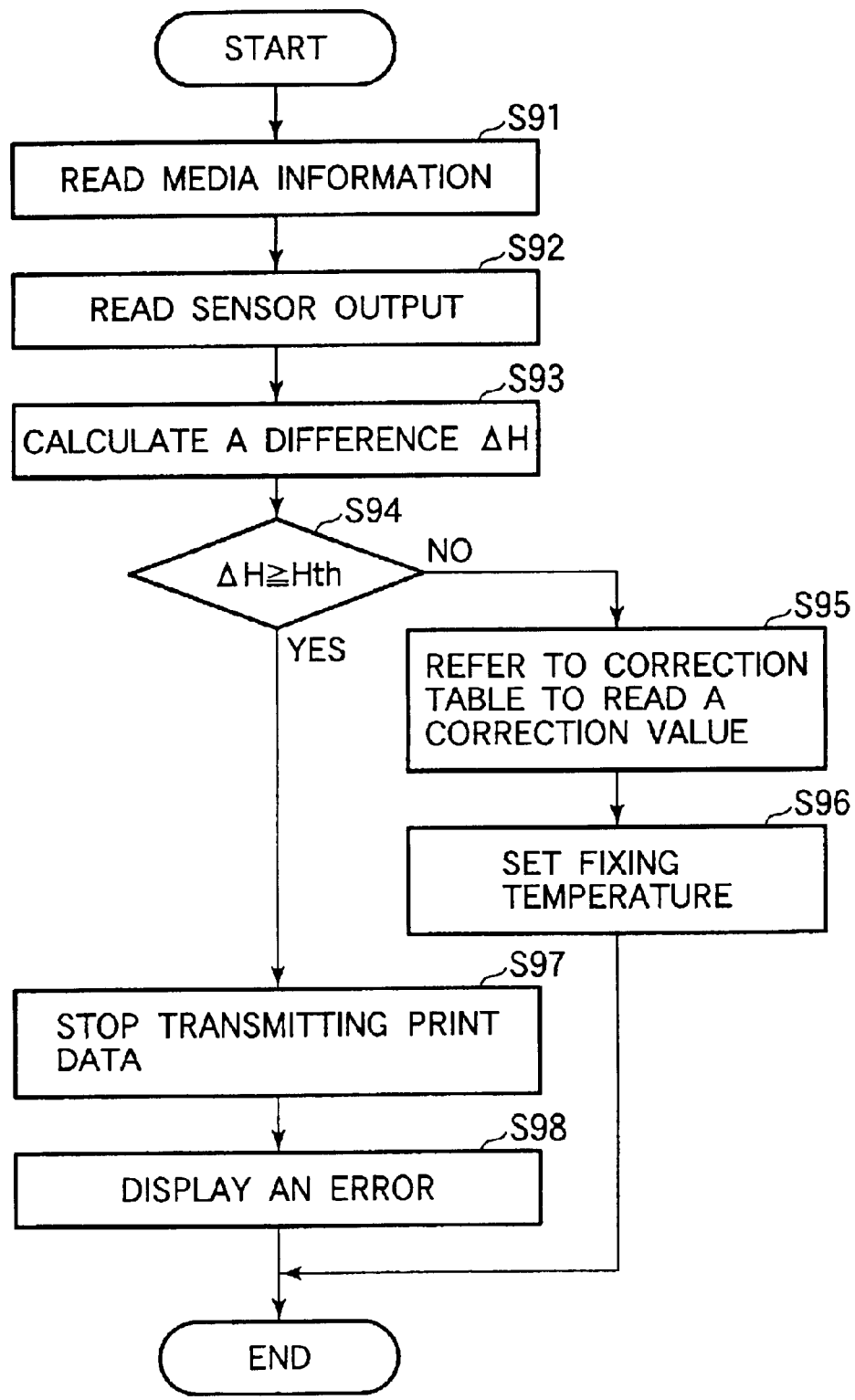
FIG. 22 is a flowchart, illustrating the operation of the image forming apparatus of FIG. 21.

FIG. 22 is a flowchart, illustrating the operation of the image forming apparatus of FIG. 21.

The yellow image forming section is disposed at a location most upstream of the transport path of the recording medium 35.

Referring to FIG. 21, an LED head 17Y illuminates the charged surface of a photoconductive drum 16Y to form an electrostatic latent image thereon. A developing roller 15Y receives yellow toner from a toner bottle 14Y and applies the yellow toner to the electrostatic latent image on the photoconductive drum 16Y, thereby developing the electrostatic latent image into a yellow toner image. A transfer roller 19Y transfers the yellow toner image onto the recording medium 35. The CPU 44 receives a detection signal from the paper-thickness detecting section 33. The paper thickness detecting section 33 according to the seventh embodiment is of the same structure as that in FIG. 13.

If a difference ΔH between the recording medium 1 to recording medium 5 (FIG. 18) and the paper-thickness detected by the paper-thickness detecting section 33 is greater than a predetermined threshold value Hth, the CPU performs an operation in which the recording is discharged without performing a printing operation, i.e., the CPU 44 stops the transmission of print data to the LED heads 17Y, 17M, 17C, and 17BK of the respective image forming sections. Specifically, the CPU 44 sets an ENABLE signal, which allows transmission of print data, to a non-active state, and performs a logical operation (AND operation) of print data to clear the print data. As a result, no electrostatic latent images are formed on the respective photoconductive drums 16Y, 16M, 16C, and 16BK. Thus, no toner image is transferred onto the recording medium 35 and the recording medium 35 simply passes through the respective transfer points defined between the respective photoconductive drums and corresponding transfer rollers.

Through the host computer 131 or the operating panel 132, the CPU 44 informs the user that printing was not normally performed. After the white, non-printed recording medium 35 has been discharged, the CPU 44 sets the image forming apparatus to a standby state where the CPU 44 is ready to receive print data from other users.

In the present embodiment, the recording medium 35 is discharged if ΔH≧Hth for recording medium 1 to recording medium 5, the recording medium 35 is not stopped in the transport path but discharged out of the apparatus. Therefore, the user does not have to open the cover of the apparatus and take the recording medium out of the apparatus. When many users access the image forming apparatus on the network, if a printing operation fails, then the CPU 44 enters a standby state where the CPU becomes ready to receive print data from another user. Therefore, print data will not be piled up in the image forming apparatus. This increases the availability factor of the image forming apparatus.

Because the transmission of print data is interrupted, a toner image is not formed. This not only eliminates the chance of the recording medium 35 tacking around the heat roller 20 of the fixing unit but prevents waste of toner. If the heat roller is de-energized when the transmission of print data is stopped, the running cost of the apparatus will further be decreased.

The present embodiment alerts the user that the printing was not carried out successfully, allowing the user to change the setting of recording medium as well as prompting the user to replace the recording medium.

The flowchart will be described as follow:

Step S91: Information on the recording medium is read.
Step S92: The sensor outputs are read.
Step S93: The difference ΔH between the detected paper thickness and the reference thickness Hr is calculated.
Step S94: A check is made to determine whether ΔH≧Hth where Hth is a predetermined threshold value. If ΔH≧Hth, then the program proceeds to step S97. If ΔH<Hth, then the program proceeds to step S95.
Step S95: A correction table is referred to read a correction value.
Step S96: A fixing temperature is set.
Step S97: The transmission of print data is stopped.
Step S98: The occurrence of an error is displayed and the error handling operation is completed.

Eighth Embodiment

{Construction}

In the seventh embodiment, when an error occurs, the transmission of print data is terminated. It is to be noted that the LED head 17Y is located over the top surface of the photoconductive drum 16Y. The transmission of print data should be terminated before the leading edge of the recording medium 35 reaches a point away from the photoconductive drum 16Y by a distance equal to a half circumferential distance on the photoconductive drum 16Y. Otherwise, a part of an electrostatic latent image can be developed with the toner and the partial toner image is transferred onto the recording medium 35. The higher the process speed and the more miniaturization of the image forming apparatus are achieved, the larger the size of undesired toner image is transferred onto the recording medium.

One way of solving this problem is to decrease the time required for determining the thickness of the recording medium 35. However, the paper-thickness detecting section 33 is very sensitive to external disturbances and noises and therefore prone to malfunction. Thus, it is difficult to shorten the time required for determining the thickness of the recording medium 35.

An eighth embodiment is directed to an apparatus where a toner image is not transferred onto the recording medium even when the transmission of print data is not stopped before the leading edge of the recording medium 35 reaches a location where the transmission of print data should be stopped.

Figure 23:
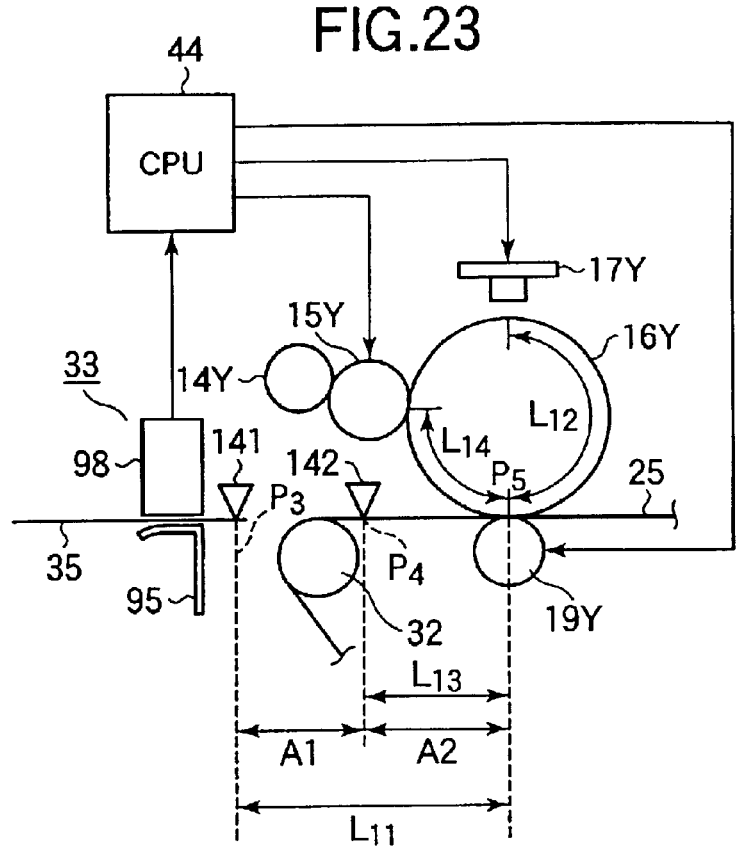
FIG. 23 illustrates a general construction of an image forming apparatus according to an eighth embodiment.

FIG. 23 illustrates a general construction of an image forming apparatus according to an eighth embodiment.

Figure 24:
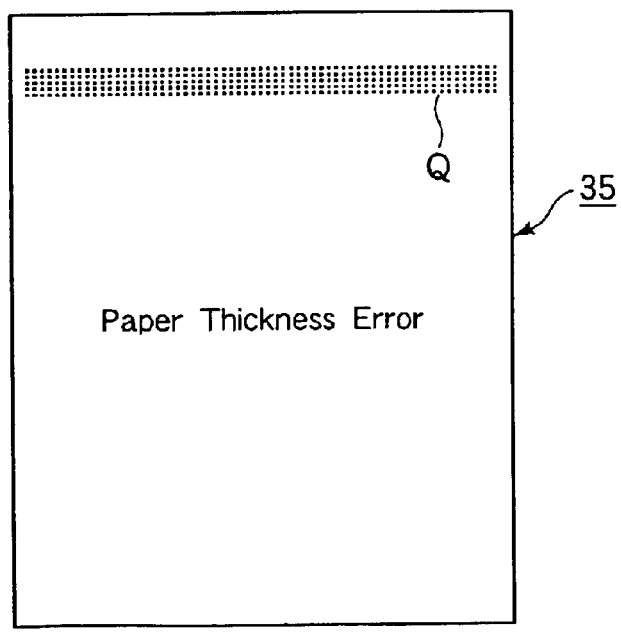
FIG. 24 is a flowchart, illustrating the operation of the image forming apparatus of FIG. 23.

FIG. 24 illustrates an example of a print pit of an error message.

Referring to FIG. 23, the paper thickness detecting section 33 is of the same structure as that in FIG. 13. A transfer point P5 is defined between the photoconductive drum 16Y and the transfer roller 19Y. A medium sensor 141 is located at a point P3 and a medium sensor 142 is located at a point P4. A distance L11 is the distance between the point P3 and the transfer point P5 and a distance L12 is the circumferential distance on the photoconductive drum 16Y between the transfer point P5 and a point on the photoconductive drum 16Y that faces the exposing unit 17Y. The medium sensor 141 is positioned such that L11=L12.

Also, a distance L13 is the distance between the point P4 and the transfer point P5 and a distance L14 is a circumferential distance on the photoconductive drum 16Y between the transfer point P5 and a point on the photoconductive drum 16Y that faces the developing unit. The medium sensor 142 is positioned such that L13=L14.

{Operation}

Figure 25:
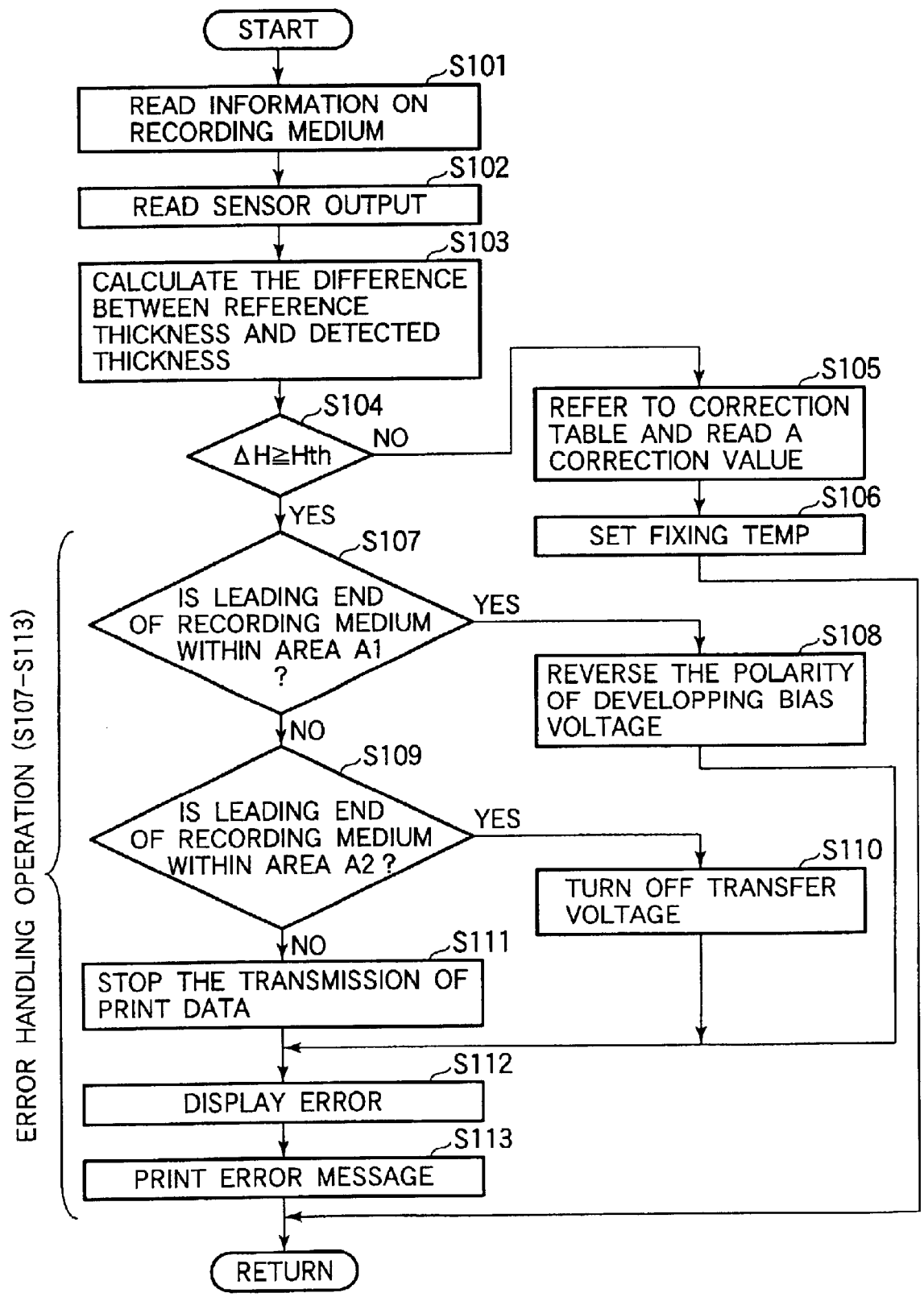
FIG. 25 is a flowchart, illustrating the operation of the image forming apparatus of FIG. 23.

FIG. 25 is a flowchart illustrating the operation of the image forming apparatus of FIG. 23.

The CPU 44 determines the thickness of recording medium 35 from the sensor output of the paper-thickness detecting section 33 (S101–S103). The CPU 44 also determines whether the medium sensors 141 and 142 have detected the leading edge of the recording medium 35.

If the CPU 44 determines that an error has occurred after the thickness of the recording medium 35 is detected, then the CPU 44 performs an error handling operation (S107–S113).

If the leading edge of the recording medium 35 has not reached the point P3, then the CPU 44 stops the transmission of print data (S133).

If the leading edge of the recording medium 35 is within an area A1 (S107) between the point P3 and the point P4 after the transmission of the print data is stopped, the CPU 44 determines that part of the toner image will be transferred onto the recording medium 35. Thus, the CPU 44 switches the developing bias voltage applied to the developing roller 15Y from negative to positive (S108), thereby preventing the toner from migrating to the photoconductive drum 16Y.

If the leading edge of the recording medium 35 is within an area A2 between the point P5 and P4 (S109) after the transmission of the print data is stopped, then the CPU 44 determines that part of the electrostatic latent image has been developed with the toner. Thus, the CPU 44 shuts off the transfer voltage (S110). That is, in the eighth embodiment, the transfer voltage applied to the transfer roller 19Y is turned off, thereby preventing a toner image from being transferred onto the recording medium 35.

It is to be noted that even if the transfer voltage is turned off, a small amount of toner can still be deposited on the recording medium 35, resulting in an insufficiently transferred partial image on a portion near the leading edge of the recording medium 35. Thus, the CPU 44 causes the black image forming section, disposed most downstream of the transport path of the recording medium 35, to print an error message "Paper thickness error" on the recording medium 35 (S135). This alerts the user that an error has occurred.

As described above, when the error handling operation is performed while the recording medium 35 is being transported at a high speed, the developing voltage or the transfer voltage is turned off depending on the position of the leading edge of the recording medium 35. This reduces waste of toner and prevents the recording medium 35 from tacking around the heat roller 20 (FIG. 1).

The flowchart will be described briefly as follows:

Step S101: Information on recording medium is read.
Step S102: The sensor outputs are read.
Step S103: The difference ΔH between the detected thickness Hd and the reference thickness Hr is calculated.
Step S104: A check is made to determine whether ΔH≧Hth where Hth is a predetermined threshold value. If ΔH≧Hth, then the program proceeds to step S107. If ΔH<Hth, then the program proceeds to step S105.
Step S105: A correction table is referred to read a correction value.
Step S106: A fixing temperature is set.
Step S107: A check is made to determine whether the leading edge of recording medium 35 is in the area A1. If YES, then the program proceeds to step S108. If NO, then the program proceeds to step S109.
Step S108: The polarity of the developing bias voltage is reversed.
Step S109: A check is made to determine whether the leading edge of recording medium 35 is within the area A2. If YES, then the program proceeds to step S110. If NO, then the program proceeds to step S111.
Step S110: The transfer voltage is turned off.
Step S111: The transmission of print data is terminated.
Step S112: The error is displayed.
Step S113: The message "Paper thickness error" is printed and the error handling operation is completed.

Ninth Embodiment

A ninth embodiment also uses the configuration shown in FIG. 23.

Figure 26:
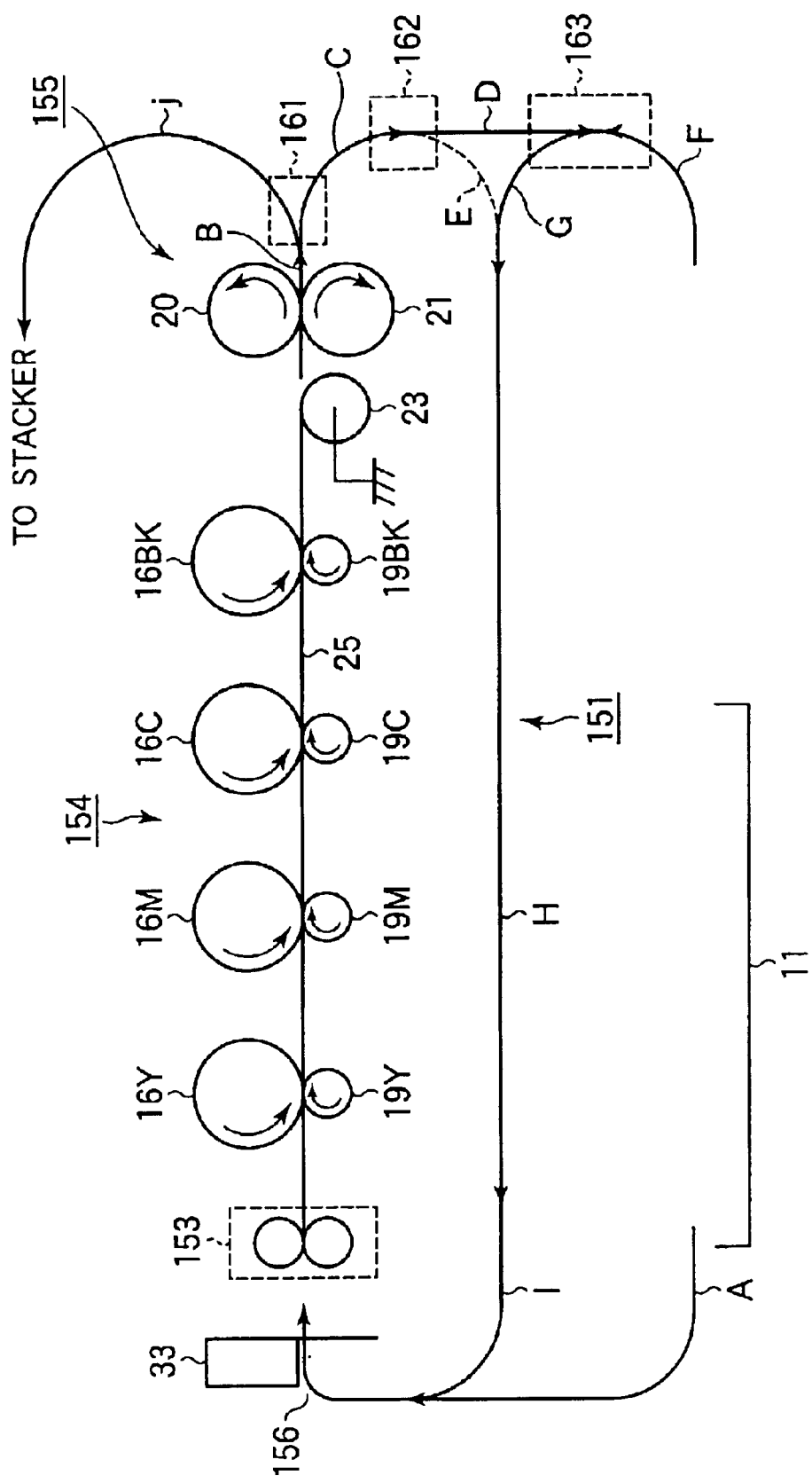
FIG. 26 illustrates a general construction of an image forming apparatus according to a ninth embodiment.

FIG. 26 illustrates a general construction of an image forming apparatus according to the ninth embodiment.

Figure 27:
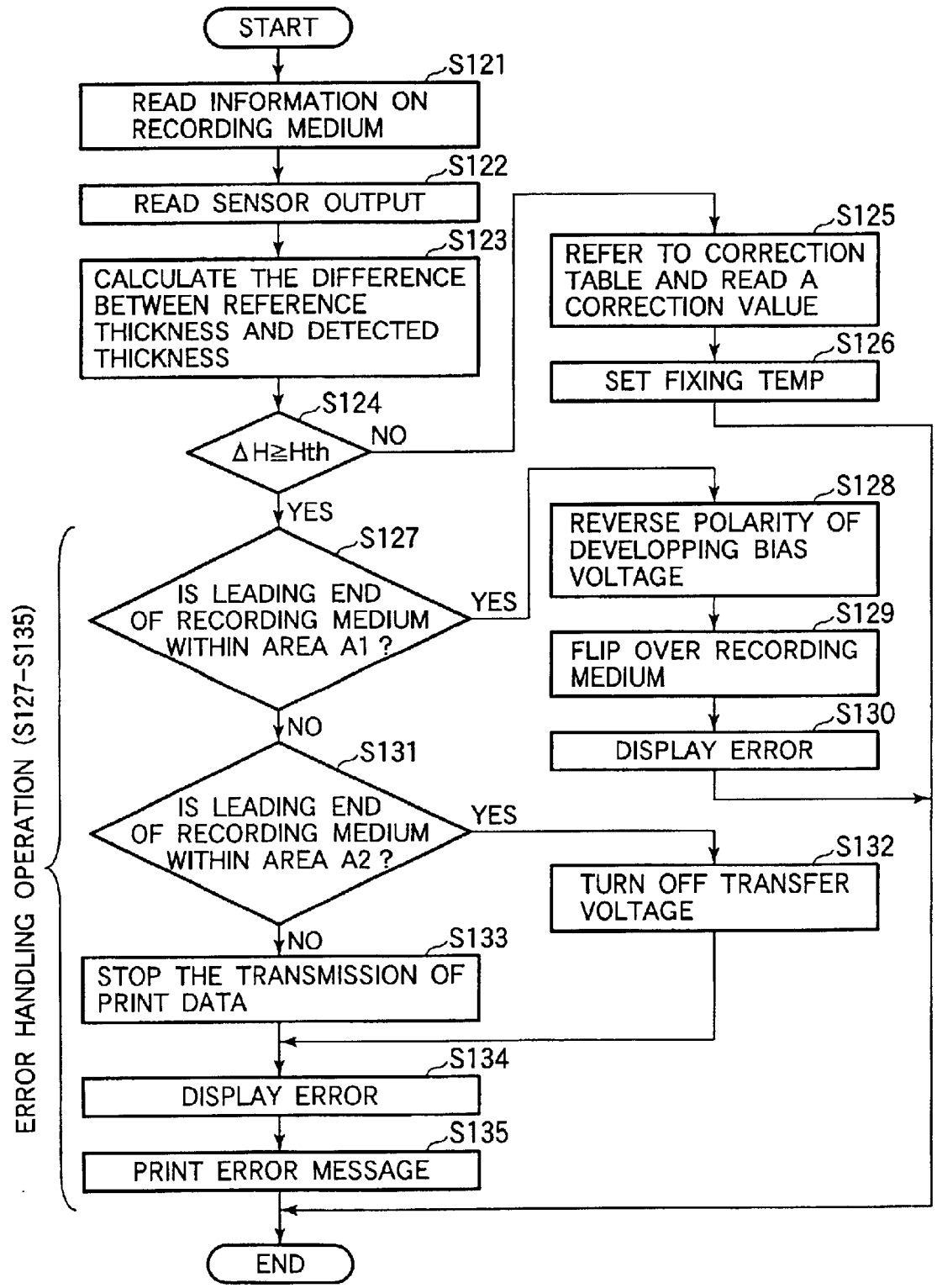
FIG. 27 is a flowchart, illustrating the operation of the image forming apparatus of FIG. 26.

FIG. 27 is a flowchart illustrating the operation of the image forming apparatus of FIG. 27.

Referring to FIG. 26, a duplex printing unit 151 is capable of printing on both sides of the recording medium 35. An attraction section 153 attracts the recording medium 35 (FIG. 1) to a transport belt 25 by the Coulomb force. The photoconductive drum unit 154 includes image-forming sections that form images of corresponding colors. A fixing unit 155 includes the heat roller 20 and the backup roller 21.

There are provided three path selectors 161, 162, and 163 in the transport path. The path selector 161 is switched to direct the recording medium 35 either into the print engine 151 or into the stacker. The path selector 162 is switched depending on whether printing is to be performed on the same side of the recording medium 35 as the last time or on the side of the recording medium 35 opposite to a side that was printed last time. When the printing is to be performed on the side opposite to a side that was printed last time, the path 163 is switched so that the recording medium 35 travels backward and is fed into a paper-feeding entrance 156.

The recording medium 35 is transported through a transport path A. Before the leading edge of the recording medium 35 reaches the paper-thickness detecting section 33, the CPU 44 reads the sensor output of the paper-thickness detecting section 33. When the leading edge of the recording medium 35 has reached the paper-thickness detecting section 33, the CPU 44 reads the sensor output the paper-thickness detecting section 33 again. Then, the CPU 44 calculates the difference between the two sensor outputs to determine the thickness of the recording medium 35.

The CPU 44 calculates the difference $\Delta H$ between the detected thickness and the reference thickness Hr. If $\Delta H \geq Hth$, the CPU determines that an error has occurred, and performs an error handling operation. During the error handling operation, if the leading edge of the recording medium 35 has not reached the point P3 (FIG. 23), then the CPU stops transmitting the print data. If the leading edge of the recording medium 35 is within the area A1 (FIG. 23), the CPU determines that even if the transmission of the print data is stopped, at least part of the toner image will have been transferred onto the recording medium 35. Therefore, the CPU 44 reverses the polarity of the developing bias voltage, applied to the developing roller 15Y, from negative to positive so that the toner does not migrate to the photoconductive drum 16Y.

At this moment, the CPU 44 causes the duplex printing unit 151 to perform printing on both surfaces of the recording medium 35. That is, the path selector 161 is switched so that the recording medium 35 is not discharged to the stacker but directed to the duplex printing unit 151. Thus, the recording medium 35 travels through transport paths B and C. The CPU 44 switches the path selector 162, so that printing is not to be performed on the both sides of the recording medium 35 but on the same side of the recording medium 35 as the last time. Then, the CPU 44 directs the recording medium 35 into a transport path E. Thus, the recording medium 35 is transported through transport paths H and I and then into the paper-feeding entrance 156 again.

Then, the CPU calculates the difference $\Delta H$ between the detected thickness and the reference thickness Hr. If the difference $\Delta H$ is smaller than a predetermined threshold value Hth, then the CPU 44 corrects the fixing temperature with a correction value, sets a corrected fixing temperature, and performs normal printing using the corrected fixing temperature.

If the CPU 44 determines that an error has occurred after the thickness of the recording medium 35 is detected, then the CPU 44 performs an error handling operation (S127–S135).

If the leading edge of the recording medium 35 has entered the area A2 (FIG. 23), then the CPU 44 determines that at least part of a toner image may have been formed. Thus, the recording medium 35 cannot be reused and the CPU 44 prints an error message as shown in FIG. 24 on the recording medium 35 (S135). Then, the CPU 44 causes the recording medium 35 to advance through the transport path B and a transport path J to the stacker.

In the normal duplex printing, the path selector 162 is switched so that printing is performed on both sides of the recording medium 35. Thus, the recording medium 35 is transported through the transport paths C, D, and F. Then, the path selector 161 is switched so that the recording medium 35 is discharged from the apparatus. The recording medium 35 travels through the transport paths B and J into the stacker.

When the transmission of print data is stopped, the recording medium 35 which has not been printed, is sent back to the print engine 151 and fed into the paper-feeding entrance 156. This operation reduces waste of recording medium 35.

The flowchart will be described briefly as follows:
Step S121: Information on recording medium is read.
Step S122: The sensor outputs are read.
Step S123: The difference $\Delta H$ between the detected thickness Hd and the reference thickness Hr is calculated.
Step S124: A check is made to determine whether $\Delta H \geq Hth$ where Hth is a predetermined threshold value. If YES, then the program proceeds to step S127. If NO, then the program proceeds to step S125.
Step S125: A correction table is referred to read a correction value.
Step S126: A fixing temperature is set.
Step S127: A check is made to determine whether the leading edge of the recording medium 35 is within the area A1. If YES, then the program proceeds to step S128. If NO, the program proceeds to step S131.
Step S128: The polarity of the developing bias voltage is reversed.
Step S129: The recording medium 35 is flopped over.
step S130: An error is displayed.
step S131: A check is made to determine whether the leading edge of the recording medium 35 is within the area A2. If YES, then the program proceeds to step S132, if NO, the program proceeds to step S133.
Step S132: The transfer voltage is turned off.
Step S133: The transmission of print data is stopped.
Step S134: An error is displayed.
Step S135: An error message is printed and the printing job is terminated.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A medium thickness detecting apparatus comprising:
a displacement section that is disposed in a transport path through which a recording medium passes, said displacement section having a sliding surface, such that the recording medium displaces said displacement section in a direction substantially normal to a surface of the recording medium when the surface of the recording medium contacts and moves across the sliding surface of said displacement section;
a mechanical amplifying section that mechanically amplifies a displacement of said displacement section by a predetermined factor; and
a thickness determining section that outputs a signal representative of an amplified value of the displacement.

2. The medium thickness detecting apparatus according to claim 1, wherein said displacement section is one of two rollers between which the recording medium passes.

3. The medium thickness detecting apparatus according to claim 1, wherein said displacement section is disposed between two rollers that extend in parallel with each other across the transport path.

4. The medium thickness detecting apparatus according to claim 3, wherein said displacement section is disposed downstream of the two rollers.

5. The medium thickness detecting apparatus according to claim 3, further comprising a stage,
    wherein said two rollers are in contact with each other to form a nip therebetween, and said stage has a surface substantially flush with a plane in which the nip formed between the two rollers extends,
    wherein said displacement section is placed on the surface and is pushed away from the surface when the recording medium passes between said displacement section and the surface.

6. The medium thickness detecting apparatus according to claim 3, the surface extends in a direction of the transport path across the nip.

7. The medium thickness detecting apparatus according to claim 3, wherein said amplifying section extends in a direction parallel to the two rollers.

8. The medium thickness detecting apparatus according to claim 1, wherein said amplifying section is a lever supported at a fulcrum so that the lever can be rocked,
    wherein said amplifying section has a first longitudinal end portion that faces said thickness determining section and a second longitudinal end portion that abuts said displacement section; and
    wherein a distance between the first longitudinal end portion and the fulcrum is longer than a distance between the second longitudinal end portion and the fulcrum.

9. The medium thickness detecting apparatus according to claim 1, wherein said displacement section abuts one of the two rollers extending across the transport path.

10. The medium thickness detecting apparatus according to claim 9, wherein said amplifying section extends in a direction parallel to the one of the two rollers.

11. The medium thickness detecting apparatus according to claim 9, wherein said amplifying section is urged by an urging member against the roller in a direction normal to the recording medium.

12. An image forming apparatus incorporating a medium thickness detecting apparatus according to claim 1, the image forming apparatus further comprising:
    a difference calculating section that calculates a difference between a reference thickness and a thickness detected by the medium thickness detecting apparatus; and
    a correcting section that corrects conditions for image forming process based on the difference.

13. The image forming apparatus according to claim 12, wherein if the difference is equal to or larger than a predetermined value, then the recording medium is discharged from the image forming apparatus.

14. The image forming apparatus according to claim 13, wherein the recording medium is not printed.

15. The image forming apparatus according to claim 12, wherein if the difference is equal to or larger than a predetermined value, then another recording medium is specified.

16. The image forming apparatus according to claim 12, wherein if the difference is equal to or larger than a predetermined value, then a developing bias voltage is changed so as not to form a toner image on an image bearing body.

17. The image forming apparatus according to claim 12, wherein if the difference is equal to or larger than a predetermined value, then a transfer voltage is shut off.

18. The image forming apparatus according to claim 12, wherein if the difference is equal to or larger than a predetermined value, then an error message is printed on the recording medium and the recording medium is discharged from the image forming apparatus.

19. The image forming apparatus according to claim 12 further having a duplex printing unit, wherein if the calculated value is equal to or larger than a predetermined value, then the recording medium is transported back to the duplex printing unit.

20. A medium thickness detecting apparatus comprising:
    a displacement section that is disposed in a transport path through which a recording medium passes, wherein when the recording medium passes said displacement section, said displacement section displaces in a direction substantially normal to a surface of the recording medium;
    a mechanical amplifying section that mechanically amplifies a displacement of said displacement section by a predetermined factor; and
    a thickness determining section that outputs a signal having a value that varies in accordance with an amount of displacement of said displacement section.

* * * * *